US009952755B2

(12) United States Patent
Ogiso

(10) Patent No.: US 9,952,755 B2
(45) Date of Patent: Apr. 24, 2018

(54) INFORMATION PROCESSING DEVICE, INFORMATION PROCESSING METHOD, DATA STRUCTURE OF CONTENT FILE, GUI PLACEMENT SIMULATOR, AND GUI PLACEMENT SETTING ASSISTING METHOD

(75) Inventor: Toru Ogiso, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 727 days.

(21) Appl. No.: 14/239,922

(22) PCT Filed: Aug. 28, 2012

(86) PCT No.: PCT/JP2012/005391
§ 371 (c)(1),
(2), (4) Date: Feb. 20, 2014

(87) PCT Pub. No.: WO2013/038605
PCT Pub. Date: Mar. 21, 2013

(65) Prior Publication Data
US 2014/0195940 A1 Jul. 10, 2014

(30) Foreign Application Priority Data

Sep. 13, 2011 (JP) .................................. 2011-199884
Sep. 13, 2011 (JP) .................................. 2011-199885

(51) Int. Cl.
*G06F 3/0484* (2013.01)
*G06F 3/0488* (2013.01)

(52) U.S. Cl.
CPC ...... *G06F 3/04845* (2013.01); *G06F 3/04847* (2013.01); *G06F 3/04886* (2013.01)

(58) Field of Classification Search
CPC ............. G06F 3/04845; G06F 3/04847; G06F 3/04886

(Continued)

(56) References Cited

U.S. PATENT DOCUMENTS 5,613,137 A * 3/1997 Bertram ................ G06F 3/0224
710/1
5,757,358 A * 5/1998 Osga ................... G06F 3/04842
345/157

(Continued)

FOREIGN PATENT DOCUMENTS

CN 1610874 4/2005
CN 101594403 12/2009

(Continued)

OTHER PUBLICATIONS

Lie et al., "Media Queries", Jul. 27, 2010, https://www.w3.org/TR/2010/CR-css3-mediaqueries-20100727/.*

(Continued)

*Primary Examiner* — Kieu Vu
*Assistant Examiner* — Alvaro R Calderon, IV
(74) *Attorney, Agent, or Firm* — Katten Muchin Rosenman LLP

(57) ABSTRACT

A GUI placement information file in which the positions of GUIs are set as the ratio to the screen size and the sizes of the GUIs are set as fixed length is prepared in association with content. In a screen having such a screen size A that the GUIs do not overlap with each other even when the setting is obeyed, the respective GUIs are displayed with the positions and sizes in accordance with the setting of the GUI placement information file (screen 134). In a screen having such a screen size B that GUIs become a state of overlapping with each other when the setting is obeyed, the setting of the position of the relevant GUI is invalidated and the position is so decided that these GUIs abut on each other (screen 136). In the case of a screen having such a screen size C that a GUI becomes a state of running off the screen when the set sizes are obeyed even in the state in which the GUIs abut on each other, the sizes of the respective GUIs are reduced (Continued)

depending on the screen size and the GUIs are displayed in a packed manner (screen 138).

7 Claims, 14 Drawing Sheets

(58) Field of Classification Search
USPC .......................................................... 715/765
See application file for complete search history.

(56) References Cited

U.S. PATENT DOCUMENTS

| | | | | |
|---|---|---|---|---|
| 5,764,218 | A * | 6/1998 | Della Bona | G06F 3/04883 345/157 |
| 6,515,687 | B1 * | 2/2003 | Wynn | G06F 3/0485 345/157 |
| 6,921,336 | B1 * | 7/2005 | Best | A63F 13/10 463/32 |
| 7,137,891 | B2 * | 11/2006 | Neveu | A63F 13/06 463/31 |
| 7,342,806 | B2 * | 3/2008 | Hickey | G06F 1/1616 361/755 |
| 7,371,163 | B1 * | 5/2008 | Best | A63F 13/10 463/1 |
| 7,479,943 | B1 * | 1/2009 | Lunsford | G06F 3/0224 345/157 |
| 7,870,511 | B2 * | 1/2011 | Suzuki | G06F 8/38 715/762 |
| 8,968,087 | B1 * | 3/2015 | Gault | A63F 13/10 345/630 |
| 2002/0021289 | A1 * | 2/2002 | Combs | G06F 3/038 345/173 |
| 2005/0083642 | A1 | 4/2005 | Senpuku et al. | |
| 2005/0162422 | A1 | 7/2005 | Miyata | |
| 2005/0195221 | A1 | 9/2005 | Berger et al. | |
| 2006/0019753 | A1 | 1/2006 | Ohta | |
| 2006/0026535 | A1 * | 2/2006 | Hotelling | G06F 3/0418 715/863 |
| 2006/0164382 | A1 * | 7/2006 | Kulas | G06F 1/1626 345/156 |
| 2006/0198555 | A1 * | 9/2006 | Hosotsubo | G06T 11/60 382/162 |
| 2006/0238625 | A1 * | 10/2006 | Sasaki | H04N 1/00416 348/231.3 |
| 2007/0229462 | A1 * | 10/2007 | Huynh | A63F 13/10 345/169 |
| 2007/0265081 | A1 * | 11/2007 | Shimura | A63F 13/10 463/37 |
| 2008/0082930 | A1 * | 4/2008 | Omernick | G06F 1/1626 715/765 |
| 2008/0192060 | A1 * | 8/2008 | Ogiso | G06F 3/14 345/546 |
| 2009/0019188 | A1 * | 1/2009 | Mattice | G06F 3/0421 710/17 |
| 2009/0037846 | A1 * | 2/2009 | Spalink | G06F 3/0482 715/825 |
| 2009/0062004 | A1 * | 3/2009 | Vedurmudi | A63F 13/00 463/37 |
| 2009/0164936 | A1 * | 6/2009 | Kawaguchi | G06F 3/0481 715/788 |
| 2009/0183098 | A1 | 7/2009 | Casparian et al. | |
| 2009/0213134 | A1 * | 8/2009 | Stephanick | G06F 3/0236 345/589 |
| 2009/0305789 | A1 * | 12/2009 | Patil | A63F 13/06 463/42 |
| 2010/0042946 | A1 * | 2/2010 | Kodimer | G06F 17/30861 715/773 |
| 2010/0058251 | A1 * | 3/2010 | Rottler | G06F 3/04845 715/863 |
| 2011/0060988 | A1 * | 3/2011 | Mysliwy | G06F 3/04817 715/702 |
| 2011/0169749 | A1 * | 7/2011 | Ganey | G06F 1/1626 345/173 |
| 2011/0197156 | A1 * | 8/2011 | Strait | G06F 3/0481 715/771 |
| 2011/0199325 | A1 * | 8/2011 | Payne | A63F 13/02 345/173 |
| 2011/0202855 | A1 | 8/2011 | Ikegami | |
| 2011/0273379 | A1 * | 11/2011 | Chen | G06F 3/04883 345/173 |
| 2011/0285636 | A1 * | 11/2011 | Howard | G06F 3/04815 345/173 |
| 2011/0319173 | A1 * | 12/2011 | Backer | A63F 13/10 463/42 |
| 2012/0056817 | A1 * | 3/2012 | Griffin | G06F 3/0482 345/173 |
| 2012/0059875 | A1 * | 3/2012 | Clark | H04L 67/14 709/203 |
| 2012/0084662 | A1 * | 4/2012 | Navarro | H04N 5/44543 715/740 |
| 2012/0110518 | A1 * | 5/2012 | Chan | G06F 3/018 715/863 |
| 2012/0169610 | A1 * | 7/2012 | Berkes | G06F 3/04883 345/173 |
| 2013/0014039 | A1 * | 1/2013 | Lachenmann | G06F 8/38 715/765 |

FOREIGN PATENT DOCUMENTS

| | | |
|---|---|---|
| JP | 2-127720 A | 5/1990 |
| JP | 2-235140 A | 9/1990 |
| JP | 2001-14077 | 1/2001 |
| JP | 2006-34517 A | 2/2006 |
| JP | 2006-331339 A | 12/2006 |
| JP | 2009-25343 A | 2/2009 |
| JP | 2009-205540 A | 9/2009 |
| JP | 2010-218533 A | 9/2010 |
| JP | 2011-51164 | 3/2011 |
| JP | 2011-51164 A | 3/2011 |
| JP | 2011-165006 | 8/2011 |
| WO | 2003/077097 | 9/2003 |

OTHER PUBLICATIONS

"Adapting to a Flexible Display Environment", Feb. 8, 2011, https://msdn.microsoft.com/en-gb/library/ms696343.aspx.*
"Best Practices in Game Design for the Ultra-Mobile PC"—Finkel et al.—EPS Software Corp.—CODE Magazine—Mar. 28, 2007.*
"Adapting Existing Applications to Work on UMPCs" Roodyn, Neil—EPS Software Corp.—CODE Magazine—Mar. 28, 2007.*
"The Proper Developer Environments for Mobile PC, Tablet PC, and Ultra-Mobile PC Applications" Graff, Elliot—EPS Software Corp.—CODE Magazine—Mar. 28, 2007.*
"Mobile PC User Experience Guidelines for Developers", Feb. 8, 2011, https://msdn.microsoft.com/en-gb/library/ms695565.aspx.*
"VJR (Virtual Joystick Region) Sample", Dec. 6, 2010, http://forum.unity3d.com/threads/vjr-virtual-joystick-region-sample.116076/#post-773620.*
Kurihara et al., "A Flexible Presentation Tool for Diverse Multi-display Environments", Sep. 26, 2007, National Institute of Advanced Industrial Science and Technology.*
McAllister, G., "A Guide to iOS Twin Stick Shooter Usability", Apr. 9, 2011, http://web.archive.org/web/20110409064011/http://www.gamasutra.com/view/feature/6323/a_guide_to_ios_twin_stick_shooter_.php?print=1.*
Hackett, M., "Analog thumb sticks for iOS using HTML5", Aug. 5, 2011, http://Www.lostdecadegames.com/analog-thumb-sticks-for-ios-using-html5/.*
"Atari Classics released for iPad", Apr. 7, 2011, http://www.atariasteroids.net/archives/date/2011/04.*
Sharma, H., "Creating a Virtual Joystick for Touch Devices", Feb. 2, 2011, http://code.tutsplus.com/tutorials/creating-a-virtual-joystick-for-touch-devices--active-7374.*
Micire et al., "Hand and Finger Registration for Multi-Touch Joysticks on Software-Based Operator Control Units," pp. 88-93, Apr. 2011. [Online]. Available: http://ieeexplore.ieee.org/xpls/abs_all.jsp?arnumber=5753487.*

(56) References Cited

OTHER PUBLICATIONS

Lobb, I., "Introducing Gamepad," Apr. 30, 2010, http://blog.iainlobb.com/2010/04/introducing-gamepad.html.*
"List of video game emulators," Mar. 21, 2012, http://web.archive.org/web/20120321075912/http://en.wikipedia.org/wiki/List_of_video_game_emulators.*
Burkey, R., "Peripheral Components for use with yaAGC," Jul. 27, 2010, http://web.archive.orglweb/20100727230919/http://www.ibiblio.org/apollo/yaTelemetry.html.*
Stuart, K., "Touchscreens, smartphones and the haptic future of games", Jun. 2, 2011, http://www.theguardian.com/technology/gamesblog/2011/jun/02/future-of-touchscreen-gaming.*
"Unity 3.4 Release Notes", Jul. 30, 2011, http://web.archive.org/web/20110730021800/http://unity3d.com/unity/whats-new/unity-3.4.*
"Unity Manual—Auto Layout", accessed on Feb. 28, 2016, http://docs.unity3d.com/Manual/UIAutolayout.html.*
"Unity Manual—Designing UI for Multiple Resolutions", accessed on Feb. 28, 2016, http://docs.unity3d.com/Manual/HOWTO-UIMutiResolution.html.*
"Unity Manual—Making UI elements fit the size of their content", accessed on Feb. 28, 2016, http://docs.unity3d.com/Manual/HOWTO-UIFitContentSize/html.*
"Unity Download Archive", accessed on Feb. 28, 2016, http://unity3d.com/get-unity/download/archive.*
Danielson, C., "Unity3D Joystick Script", May 17, 2011, http://www.chrisdanielson.com/2011/05/17/unity3d-joystick-script/.*
"Using Xpadder", Aug. 31, 2010, http://web.archive.org/web/20100831121009/http://fretsonfire.wikidot.com/using-xpadder.*
Bitmob, "Virtual controls for touchscreen gaming", Apr. 29, 2011, http://venturebeat.com/2011/04/29/virtual-controls-for-touch-screen-gaming/.*
"Virtual Joystick Component for Iphone-Ipad?", Dec. 23, 2010, http://forum.unity3d.com/threads/virtual-joystick-component-for-iphone-ipad.71771/.*
Ivo, "Xpadder: Use Your PC Gamepad Instead of Keyboard", May 26, 2007, http://www.racketboy.com/retro/xpadder-use-your-pc-gamepad-instead-of-your-keyboard.*
"Xpadder Forum—What can Xpadder do and what can it not do?", Feb. 2, 2011, http://xpadder.com/forum4/viewtopic.php?f=26&t=2422.*
"Mobile PC", Feb. 8, 2011, https://web.archive.org/web/20110226173423/http://msdn.microsoft.com:80/en-us/library/dd302492(v=VS.85).aspx.*
International Search Report dated Dec. 4, 2012 from the corresponding PCT/JP2012/005391.
European Search Report dated May 20, 2015 from corresponding Application No. 12832539.6.
Chris Danielson, Unity3D Joystick Script, Chris Danielson's Blog, May 17, 2011, retrieved from the Internet: URL: http://www.chrisdanielson.com/2011/05/17/unity3d-joystick-script, retrieved on May. 8, 2015.
"Supporting Multiple Screens", Android Developers, May 17, 2011, Retrieved from the Internet: URL:http://developer.android.com/guide/practices/screens_support.htm, retrieved on May 8, 2015.
"GUITexture Screen Size", Unity Community, Jun. 8, 2010, Retrieved from the Internet: URL:http://forum.unity3d.com/threads/guitexture-screen-size.50889, retrieved on May 8, 2015.
"GUI best practices?", Unity Answers, Jun. 9, 2010, Retrieved from the Internet: URL:http://answers.unity3d.com/questions/17289/whats-the-right-way-to-code-a-gui.htm, retrieved on May 8, 2015.
Translation of International Preliminary Report on Patentability dated Mar. 18, 2014 from corresponding Application No. PCT/JP2012/005391.
Chinese First Office Action dated Mar. 29, 2016 from corresponding Application No. 201280042985.3.

* cited by examiner

FIG. 4

| GUI | DISPLAYING | POSITION | | SIZE | | LEFT-RIGHT LINK |
|---|---|---|---|---|---|---|
| | | X (INCH) | Y (%) | W (INCH) | H (INCH) | |
| L BUTTON | ON | 0.453 | 5 | 0.906 | 0.906 | ON |
| R BUTTON | ON | -0.453 | 5 | 0.906 | 0.906 | ON |
| LEFT JOYSTICK | ON | 0.734 | 20 | 1.468 | 1.468 | ON |
| RIGHT JOYSTICK | ON | -0.734 | 20 | 1.468 | 1.468 | ON |
| DIRECTIONAL KEY | ON | 1.296 | 45 | 2.593 | 2.93 | ON |
| FOUR-TYPE BUTTON | ON | -1.322 | 45 | 2.645 | 2.510 | — |
| SELECT/START BUTTON (HORIZONTAL) | ON | 0 | 96 | 2.843 | 0.552 | — |
| SELECT/START BUTTON (VERTICAL) | ON | -0.552 | 70 | 1.104 | 1 | |

102 104 106 108 110

100

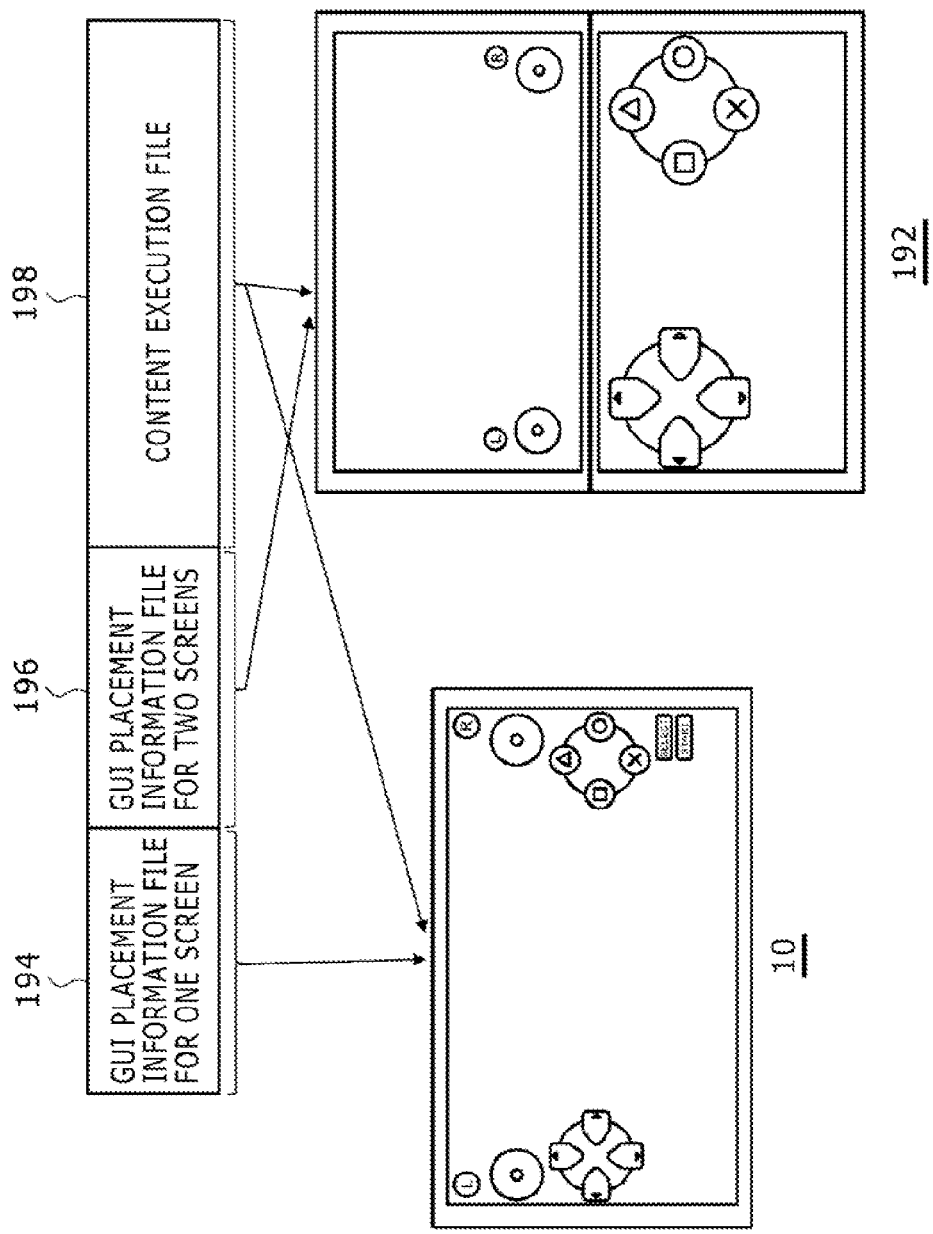

INFORMATION PROCESSING DEVICE, INFORMATION PROCESSING METHOD, DATA STRUCTURE OF CONTENT FILE, GUI PLACEMENT SIMULATOR, AND GUI PLACEMENT SETTING ASSISTING METHOD

TECHNICAL FIELD

The present invention relates to an information processing technique to accept manual operation input by a user by using a touch panel.

BACKGROUND ART

In recent years, pieces of small-size information apparatus intended to be portable, such as portable game machine, mobile phone, PDA (Personal Data Assistance), and tablet, have become popular. In such small-size apparatus, because of restrictions on its size, input means is also limited. As a result, input means and functions specialized for the small-size apparatus have uniquely developed. For example, covering a display surface by a touch panel and enabling input by a finger and a touch pen can give the user a feeling as if the user directly operates objects and so forth displayed on the display. Meanwhile, environments for executing, by utilizing such small-size apparatus, information processing equivalent to that executed by stationary game consoles and personal computers are also being developed. For example, it is becoming possible to enjoy advanced games irrespective of location through operation of small-size apparatus by a user and execution of actual information processing by stationary apparatus connected via a network. Furthermore, it is also becoming possible to carry out games originally for stationary apparatus by small-size apparatus by emulation.

SUMMARY

Technical Problem

As above, in recent years, there is a technological direction to allow information processing of games and so forth to be executed irrespective of the size and use environment of apparatus. However, there is a problem that, when such advanced information processing is attempted to be executed by utilizing small-size apparatus, the operability is poor attributed to restrictions on input means as described above. Furthermore, although, particularly in small-size apparatus, it is effective to display a GUI (Graphical User Interface) in a screen as input means in order to ensure the screen size, it is difficult to make a fine setting for each of contents to be displayed and for each of the screen sizes of devices.

The present invention is made in view of such problems and an object thereof is to provide a technique capable of easily realizing input means with a form suitable for contents to be displayed and the size of a screen.

Solution to Problem

Another aspect of the present invention relates to an information processing device. This information processing device is an information processing device that includes a display covered by a touch panel and executes information processing selected by a user. The information processing device is characterized by including a GUI image generator that generates a GUI (Graphical User Interface) image to be displayed on the display, and an operation information converter that identifies the contents of operation carried out by the user from a correspondence relationship between a contact point detected by the touch panel and the GUI image being currently displayed. The GUI image generator finally decides the position and size of a GUI and generates the GUI image by carrying out adjustment corresponding to a result of comparison between the actual size of the display with a condition with respect to a display size, obtained from setting values of the position and size of the GUI recorded in a GUI placement information file created as a standard setting irrespective of the display size.

Another aspect of the present invention relates to an information processing method. This information processing method is characterized in the following. An information processing device that includes a display covered by a touch panel and executes information processing selected by a user includes a step of generating a GUI (Graphical User Interface) image to be displayed on the display, and a step of identifying the contents of operation carried out by the user from a correspondence relationship between a contact point detected by the touch panel and the GUI image being currently displayed. The step of generating the GUI image includes a step of comparing the actual size of the display with a condition with respect to a display size, obtained from setting values of the position and size of a GUI recorded in a GUI placement information file created as a standard setting irrespective of the display size, and a step of finally deciding the position and size of the GUI and generating the GUI image by carrying out adjustment corresponding to a comparison result.

Further another aspect of the present invention relates to a data structure of a content file. This data structure of a content file is a data structure of a content file executed by an information processing device including a display covered by a touch panel. The data structure is characterized in that an execution file for executing information processing relating to content is associated with a GUI placement information file as a file that is referenced to generate a GUI (Graphical User Interface) image to be displayed on the display and is created as a standard setting irrespective of a display size. Setting values of the position and size of a GUI are recorded in the GUI placement information file. The GUI placement information file is for finally deciding the position and size of the GUI by carrying out adjustment corresponding to a result of comparison between the actual size of the display with a condition with respect to the display size, obtained from the setting values.

Further another aspect of the present invention relates to a GUI placement simulator. This GUI placement simulator is a GUI placement simulator that assists setting of information relating to placement of a GUI (Graphical User Interface) to be displayed by on-screen displaying on a content image that should be displayed as a result of information processing in an information processing device including a display covered by a touch panel. The GUI placement simulator is characterized by including a placement setting acceptor that accepts basic setting values of the position and size of the GUI, a screen size designation acceptor that accepts size designation of a display of an assumed information processing device, a GUI image display section that decides the position and size of the GUI by carrying out adjustment corresponding to a result of comparison between a designated display size with a condition with respect to a display size, obtained from the basic setting values, and displays the GUI with placement in accordance with the decision in a rectangular area representing a virtual screen having the designated size, and a storage that stores the basic setting values settled as a GUI placement information file.

Further another aspect of the present invention relates to a GUI placement setting assisting method. This GUI placement setting assisting method is a GUI placement setting assisting method carried out by a GUI placement simulator that assists setting of information relating to placement of a GUI (Graphical User Interface) to be displayed by on-screen displaying on a content image that should be displayed as a result of information processing in an information processing device including a display covered by a touch panel. The GUI placement setting assisting method is characterized by including a step of accepting basic setting values of the position and size of the GUI, a step of accepting size designation of a display of a virtual information processing device, a step of deciding the position and size of the GUI by carrying out adjustment corresponding to a result of comparison between a designated display size with a condition with respect to a display size, obtained from the basic setting values, a step of displaying, on the display, an image in which the GUI is placed based on placement in accordance with the decision in a rectangular area representing a virtual screen having the designated size, and a step of storing the basic setting values settled as a GUI placement information file.

What are obtained by translating arbitrary combinations of the above-described constituent elements and expressions of the present invention among method, device, system, computer program, and so forth are also effective as modes of the present invention.

Advantageous Effects of Invention

According to the present invention, input means suitable for the contents of display and the screen size can be easily realized.

BRIEF DESCRIPTION OF DRAWINGS

FIG. 4 is a diagram showing a structure example of data recorded in a GUI placement information file in the present embodiment.

FIG. 14 is a diagram for explaining a mode in which plural GUI placement information files are associated with one content execution file in the present embodiment.

DESCRIPTION OF EMBODIMENTS

Figure 1:
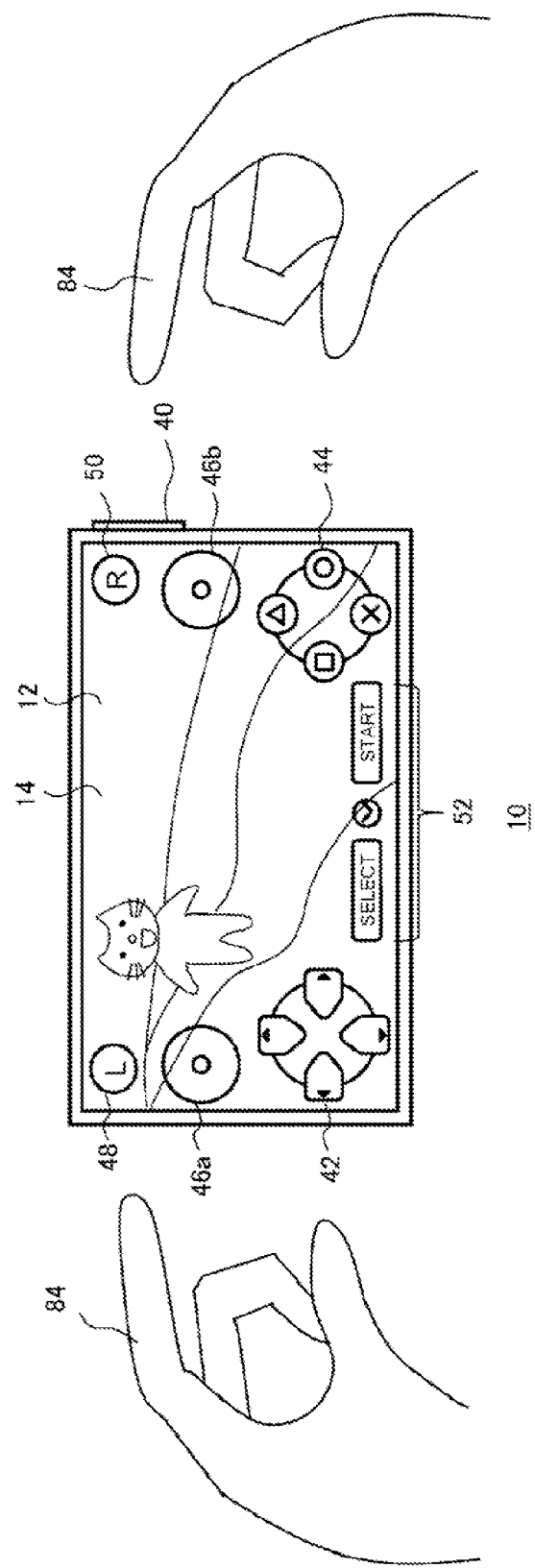
FIG. 1 is a diagram showing an appearance example of an information processing device of the present embodiment.

FIG. 1 shows an appearance example of an information processing device of the present embodiment. An information processing device 10 is a small-size device portable for the user and may be any of mobile phone, PDA, portable game machine, tablet, etc. It may have functions obtained by combining them. Therefore, the information processing device 10 may have various processing mechanisms corresponding to the functions. However, description thereof will be omitted as appropriate hereinafter because general techniques can be utilized for them.

The information processing device 10 has a configuration in which a display 14 is disposed on the main body front surface and an activation switch 40 is disposed on a side surface. On the back side of the display 14, mechanisms necessary for various kinds of information processing, such as CPU, graphic processor unit, sound processor, and memory, are incorporated (not shown). The display 14 may be any of general displays such as liquid crystal display, EL (Electronic Luminescence) display, and plasma display. The top surface of the display 14 is covered by a touch panel 12. The touch panel 12 is implemented by any of systems put into practical use, such as resistive film system, optical system, and capacitive coupling system.

Besides, the information processing device 10 may include a speaker to output sounds, an earphone connection terminal, mechanisms of infrared port and wireless LAN for communications with other devices, a battery box, etc. These elements are not shown in the diagram.

On the display 14, screen images necessary for operation inputs by the user, such as menu screen and icons, and screen images as the result of information processing, such as game screen, moving image reproduction screen, text displaying screen, and photograph displaying screen, are displayed according to functions. Moreover, GUIs for allowing the user to make operation inputs while viewing them are displayed by on-screen displaying.

The user makes operation inputs to the information processing device 10 by touching the touch panel 12 with a hand finger and sliding it on the touch panel 12 in such a manner as to operate the GUI. In FIG. 1, the following GUIs are implemented in the information processing device 10: a directional key GUI 42 made by displaying graphics of directional keys; a four-type button GUI 44 made by displaying graphics of a group of four types of operation buttons, i.e. circle button, cross button, square button, and triangle button; joystick GUIs 46a and 46b made by displaying graphics for making direction instructions in an omnidirectional manner; an L button GUI 48 made by displaying graphics of an "L" button; an R button GUI 50 made by displaying graphics of an "R" button; and a SELECT/START button GUI 52 made by displaying graphics of a "SELECT" button and a "START" button.

The following description will be made by taking the GUIs shown in FIG. 1 as an example. However, they are merely exemplification and are not intended to limit the designs and roles thereof. These GUIs are introduced to realize input means having operability equivalent to that of a controller of a stationary game console for example. The directional key GUI 42 is so configured as to allow key-in in four directions of upward, downward, left and right directions or eight directions including also intermediate directions among these four directions, and is used for e.g. cursor movement on a screen and scrolling of a screen. Furthermore, it may be used to change the movement direction of a character appearing in a game in a game screen.

To the four-type button GUI 44, functions different from each other depending on the contents of processing to be executed are assigned. For example, in selection of a desired item in a menu screen, the target of highlighting among item names and icons displayed in a list is moved by touching a key of any direction of the directional key GUI 42 and the selection is settled by touching the circle button of the four-type button GUI 44. Furthermore, in a dialogue-type game, affirmative and negative intensions may be indicated by touching the circle button and cross button of the four-type button GUI 44 for example.

The L button GUI 48 and the R button GUI 50 are used to change the direction of the line of sight in a game and add a different motion through simultaneous operation with another button for example. The "SELECT" button in the SELECT/START button GUI 52 is used to make a choice from items displayed as a menu for example, and the "START" button is used to start e.g. moving image or music reproduction.

As shown in the diagram, between the "SELECT" button and the "START" button, a figure representing a button for switching the state of the SELECT/START button GUI 52 between the displayed state and the non-displayed state may be further displayed. When this figure is touched in this state, the SELECT/START button GUI 52 enters the non-displayed state and only this figure is left. When this figure is operated in this state, the SELECT/START button GUI 52 appears. Furthermore, it is also possible to use this figure e.g. for the purpose of temporarily improving the visibility of content and facilitating touch to content by setting all GUIs other than this figure to the non-displayed state when this figure is touched. Also in this case, by touching this figure again, the GUIs temporarily set to the non-displayed state are displayed again. Also to the L button GUI 48, the R button GUI 50, and the SELECT/START button GUI 52, various functions may be assigned depending on the contents of processing to be executed.

The left and right joystick GUIs 46*a* and 46*b* are GUIs made by duplicating, as images in a pseudo-manner, joysticks that are used in e.g. a controller for games and can be tilted in an arbitrary direction. The joystick GUIs 46*a* and 46*b* are formed of at least one circle and are so configured that direction and magnitude are input based on the direction and distance from the center of the circle to a contact point by the user.

Figure 2:
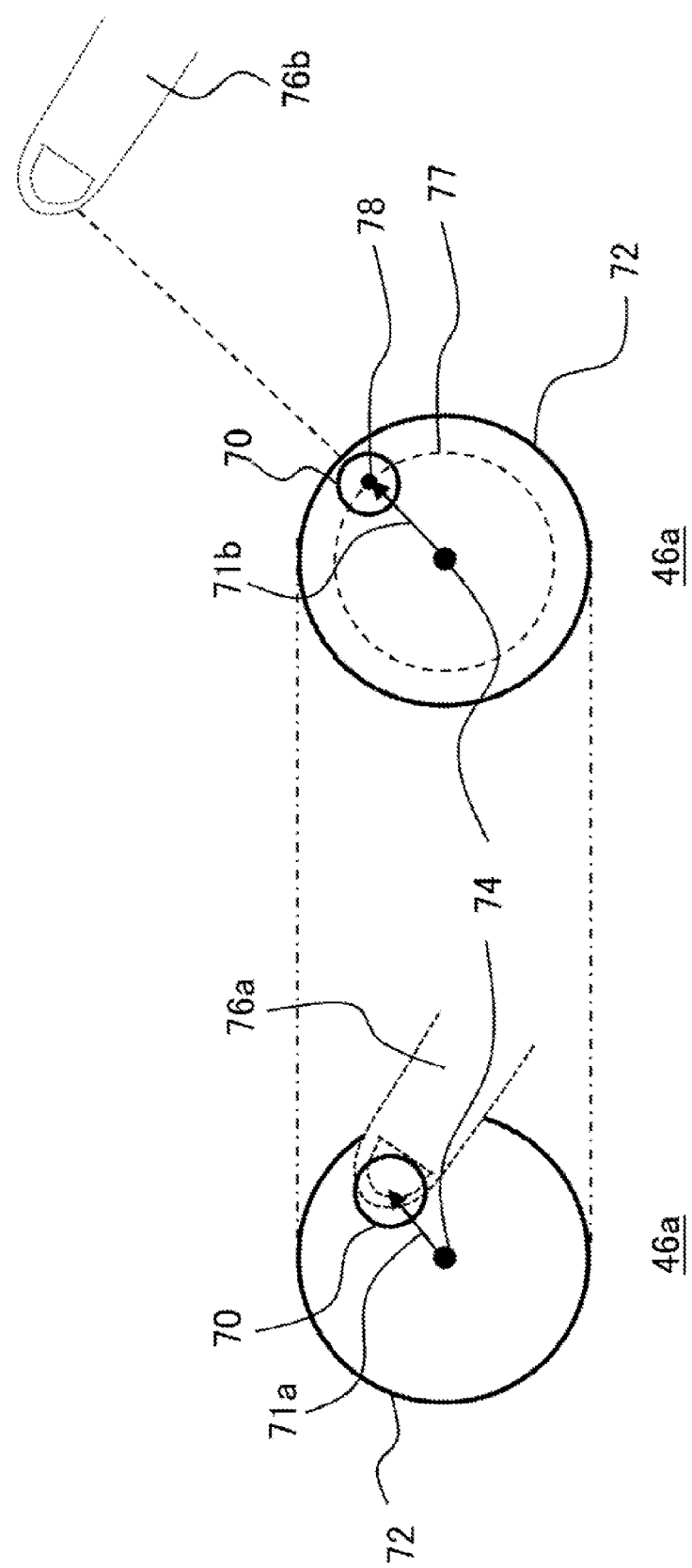
FIG. 2 is a diagram for explaining graphics displayed as a joystick GUI in the present embodiment and an operation method thereof.

This GUI enables input of arbitrary direction and arbitrary amount and thus can be used for control of e.g. the movement direction and movement speed of a character or object appearing in a game and turn of the field of view. FIG. 2 is a diagram for explaining graphics displayed as the joystick GUI 46*a* and an operation method thereof. The following description about the joystick GUI 46*a* applies also to the joystick GUI 46*b*.

Operation to the joystick GUI 46*a* is deemed as valid during the period when the user slides a finger on the touch panel without separating it from the touch panel after touching an area in a circle 72 displayed as the graphics of the joystick GUI 46*a*. Furthermore, as shown on the left side in FIG. 2, the direction and size of a direction vector 71*a* from the center 74 of the circle 72 to a contact point of a finger 76*a* of the user are continuously acquired to be deemed as input direction and input value corresponding to tilt direction and tilt angle when an actual joystick is operated.

At this time, a marker 70 formed of e.g. a circle is displayed at the place with which the finger 76*a* is in contact, and is moved in matching with the movement of the contact point. Preferably, the marker 70 has such size and shape as not to be hidden by the finger. Moreover, the visibility of the marker 70 is further improved by making an image modification around it as if it is shining, or slightly offsetting the position of the marker 70 as if the marker 70 tracks the movement of the contact point, or faintly displaying the movement trajectory thereof.

During the period when the operation to the joystick GUI 46*a* is valid, i.e. during the period when the contact starting from an area in the circle 72 continues, an area outside the circle 72 is also used as the detection area of this operation as shown on the right side in FIG. 2. For example, the whole area of the touch panel 12 may be used as the detection area. At this time, by disabling the other GUIs displayed on the display 14, the operation to the joystick GUI 46*a* can be carried out more freely by using a wide area.

When the contact point of the finger 76*b* exists outside the circle 72, only the direction from the center 74 of the circle is acquired as the input direction, and the input value is saturated at the value of the radius of the circle 72 or a concentric circle having a predetermined radius (in FIG. 2, concentric circle 77) irrespective of the distance from the center 74 to the contact point. At this time, the marker 70 is so displayed as to be inscribed in the circle 72 and move corresponding to the direction of the contact point.

The contents of operation that can be realized by providing such GUIs can be variously changed according to button assignation corresponding to the functions realized by the information processing device. In the present embodiment, by duplicating input means in stationary game consoles and personal computers in a form of a touch panel in the above-described manner, the variation of operation input in small-size information apparatus can be made equivalent to that in stationary game consoles or the like. Furthermore, games to which a user is accustomed with a stationary game console can be carried out also in small-size apparatus with similar operability without a feeling of discomfort.

On the other hand, the environment in which the input means is provided in the screen as above causes a trade-off relationship between pursuing enhancement in the operability through increase in the number of kinds of input means and increase in the size of the input means and improving the visibility of the original image as the processing result, such as content image. The optimum balance between them changes depending on various factors such as the contents of information processing, the image desired to be displayed, the kinds and use frequencies of input means, and the screen size. In the present embodiment, a GUI displaying mechanism capable of responding to changes in such factors is realized.

Figure 3:
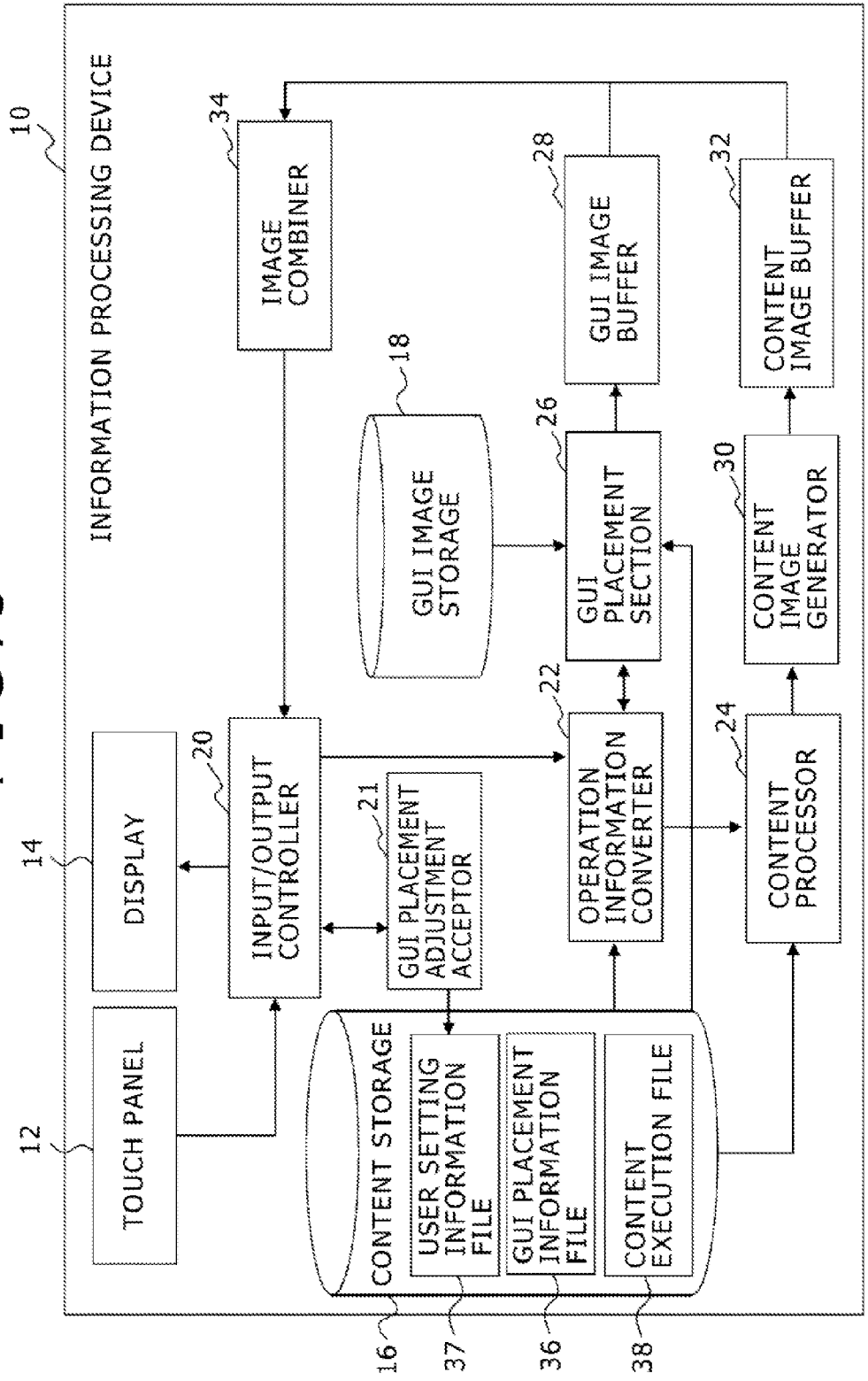
FIG. 3 is a diagram showing the configuration of the information processing device in the present embodiment in detail.

FIG. 3 shows the configuration of the information processing device 10 in detail. Besides the touch panel 12 and the display 14 described above, the information processing device 10 includes a content storage 16 that stores programs for displaying content and various kinds of data, a GUI image storage 18 that stores data of material images prepared as GUIs, and an input/output controller 20 that controls reception of an input signal from the touch panel 12 and output of image data to the display 14. The information processing device 10 further includes a GUI placement adjustment acceptor 21 that accepts adjustment of the sizes and placement of the respective GUIs by the user, an operation information converter 22 that converts the input signal from the touch panel to information on the contents of operation, a GUI placement section 26 that places images of the respective GUIs on the coordinate system of the screen, and a GUI image buffer 28 that temporarily stores a GUI image after placement.

The information processing device 10 further includes a content processor 24 that executes information processing relating to content displaying in accordance with the contents of operation to the GUI, a content image generator 30 that generates an image of content, a content image buffer 32 that temporarily stores the generated image of content, and an image combiner 34 that generates an image obtained by on-screen displaying of the GUI image on the image of content.

Here, the kind of "content" is not limited as long as it is an object that can be electronically processed and displayed on a display, such as computer game, moving image, text, photograph, or picture. Furthermore, the present embodiment can be applied to not only general "content" but also general information processing such as webpage browsing, schedule management, address list displaying, text creation, and table calculation. In the following description, executing such information processing accompanied by image displaying will be referred to collectively as "execution of content."

The image configured by the respective GUIs placed on the coordinate system of the screen by the GUI placement section 26 will be referred to as a "GUI image" hereinafter. That is, an image obtained by on-screen displaying of a "GUI image" on a "content image" as the result of information processing is displayed on the display 14 as the final image.

Figure 11:
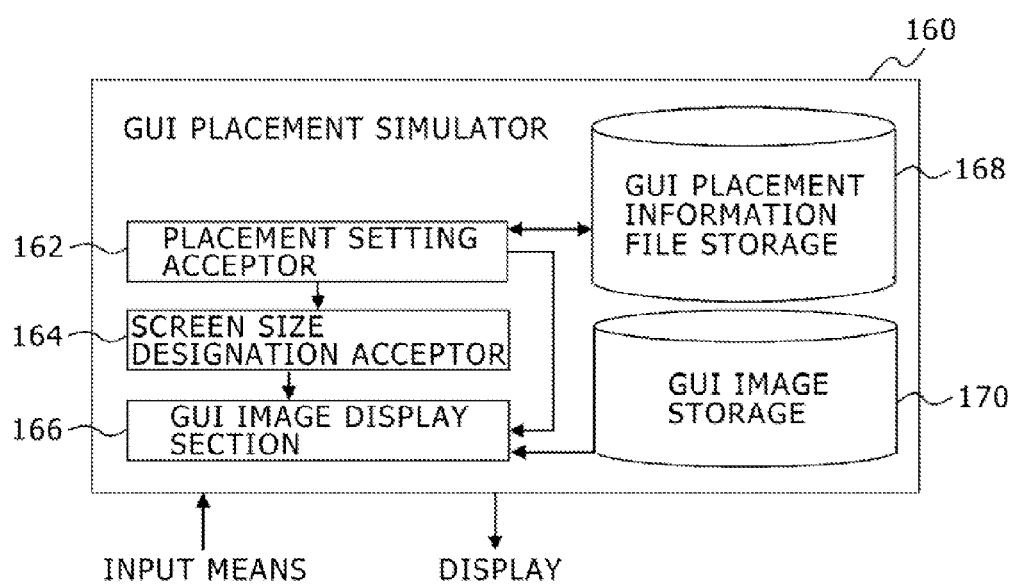
FIG. 11 is a diagram showing the configuration of a GUI placement simulator that assists creation of the GUI placement information file in the present embodiment.

In FIG. 3 and FIG. 11 to be described later, the respective elements shown as functional blocks to execute various kinds of processing can be formed by CPU, memory, and other LSIs in terms of hardware, and are realized by programs and so forth that process content and execute image processing in terms of software. Therefore, it will be understood by those skilled in the art that these functional blocks are realized in a variety of forms by only hardware, or only software, or a combination of them, and they are not limited to either one.

The input/output controller 20 connects to the touch panel 12 and the display 14 by an existing method to control input and output of data. The input signal received from the touch panel 12 includes the coordinates of a contact point touched on the touch panel 12 by the user, the movement route of the coordinates when the contact point continuously moves, and so forth. The method for detecting the contact point in the touch panel 12 differs depending on the system thereof and therefore is not mentioned here. The input/output controller 20 outputs a video signal of an image to be displayed to the display 14.

The content storage 16 stores a content execution file 38 in which programs necessary for processing of content and various kinds of data such as image data are recorded. Besides, the content storage 16 stores a GUI placement information file 36 that is set in association with the relevant content and in which basic information relating to the position and size of each GUI is recorded, and a user setting information file 37 in which the result of adjustment of the positions and sizes of GUIs by a user is recorded. The GUI placement information file 36 is created by a content creator or the like and is provided in association with the content execution file 38. The GUI placement adjustment acceptor 21 is an interface for allowing the user to adjust the information recorded in the GUI placement information file 36 thus provided, i.e. the positions and sizes of the respective GUIs, according to the user's preference to create the user setting information file 37.

For example, if content is a game, the program thereof, information on players, and information on the attainment level in the last playing and so forth are recorded in the content execution file 38. If content is a movie or music, compression-encoded video data and/or audio data and a program to decode and reproduce the data, and so forth are recorded. The content storage 16 may be a hard disc drive or may be implemented by a combination of a removable recording medium such as memory card, ROM disc, optical disc, or magneto-optical disc and a reading device corresponding to it.

The GUI image storage 18 is a storage device such as a hard disc drive that stores image data serving as materials of the GUI image, such as directional keys and four-type buttons. The operation information converter 22 acquires the input signal from the touch panel 12 from the input/output controller 20 and converts the coordinates of a contact point and so forth included in this signal to information on the contents of operation. Specifically, the operation information converter 22 interprets operation to the GUI shown in FIG. 1. Besides, also in selection input from an icon array or menu screen displayed as an initial screen or the like, the operation information converter 22 identifies the selected item based on a contact point.

For this purpose, information showing the correspondence relationship between the areas where the operation-target graphics of icons, menu items, GUIs, etc. are displayed and the contents of operation when the relevant area is touched is recorded in the content execution file 38 and the operation information converter 22 reads out it. Furthermore, the operation information converter 22 acquires information relating to the areas of the GUIs shown in FIG. 1 by notification from the GUI placement section 26 when a GUI image is generated by the GUI placement section 26.

Moreover, the operation information converter 22 associates an area with the contents of operation based on association between identification information of the GUI and the contents of operation, set in the content execution file 38. In actual operation, if the coordinates of a contact point acquired from the input/output controller 20 exist in the detection area of any of the respective GUIs being currently displayed, the operation information converter 22 identifies the contents of operation associated with the relevant GUI.

Information relating to content processing in the information on the contents of operation is notified to the content processor 24 and information relating to displaying of the GUI is notified to the GUI placement section 26. When operation of selecting content is carried out or when operation by which displaying of a GUI should be changed is carried out, the GUI placement section 26 scales images of the respective GUIs read out from the GUI image storage 18 according to need and places the images on the coordinate system of the screen based on the user setting information file 37 read out from the content storage 16 or information set in the GUI placement information file 36. When reading out the GUI placement information file 36, the GUI placement section 26 compares the screen size of the display 14 of its own device with the information set in the GUI placement information file 36 and decides the positions and sizes of the GUIs so that they may fit the screen size with compliance with the setting.

A GUI image generated as the result of the placement is stored in the GUI image buffer 28. Moreover, information on the decided positions and sizes of the GUIs is given also to the operation information converter 22. By configuring the GUI placement section 26 and the operation information converter 22 with capability of bidirectional information transmission, another GUI can be newly displayed or the placement, size, design, etc. can be changed according to operation to the GUI being currently displayed. For example, in the state in which operation to the joystick GUI 46a shown in FIG. 2 is valid, the images of the other GUIs disabled may be set to the non-displayed state. Displaying of the marker 70 can also be carried out by the same mechanism.

The content processor 24 refers to the content execution file 38 stored in the content storage 16 and executes processing of content in accordance with the contents of operation by the user. The actual processing procedure is as generally executed according to the contents of the content. The content image generator 30 generates data of a content image that should be output as the result of the processing by the content processor 24 and stores it in the content image buffer 32.

The image combiner 34 executes image processing by using the data of the GUI image stored in the GUI image buffer 28 and the data of the content image stored in the content image buffer 32 to thereby generate an image obtained by on-screen displaying of the GUI image on the content image and store it in an internal frame buffer. A video signal corresponding to the image stored in this frame buffer is transmitted to the display 14 under control by the input/output controller 20. Thereby, an image including the GUIs is displayed on the display 14. FIG. 4 shows a structure example of data recorded in the GUI placement information file 36. In the present embodiment, as described above, one GUI placement information file 36 is created for each piece of content as the standard setting in common irrespective of the screen size, and the GUI placement section 26 of each information processing device places the respective GUIs with positions and sizes suitable for the screen size of its own device with reference to the relevant file.

A GUI placement information table 100 recorded in the GUI placement information file 36 includes a GUI identification information field 102, a displaying switching field 104, a position field 106, a size field 108, and a left-right link field 110. The GUI identification information field 102 shows the identification information of GUIs that can be displayed. In FIG. 4, the names of the following eight GUIs are shown: "L button," "R button," "left joystick," "right joystick," "directional key," "four-type button," "SELECT/START button (horizontal)," and "SELECT/START button (vertical)."

The seven GUIs other than the "SELECT/START button (vertical)" correspond to the L button GUI 48, the R button GUI 50, the joystick GUIs 46a and 46b, the directional key GUI 42, the four-type button GUI 44, and the SELECT/START button GUI 52, respectively, shown in FIG. 1. The "SELECT/START button (vertical)" is a GUI obtained by transforming the "SELECT/START button (horizontal)."

Although the names of the respective GUIs are shown in the GUI identification information field 102 in FIG. 4, e.g. identification codes or identification numbers may be shown. Such GUI identification information is used in common also as the information on association between the GUI and the contents of operation, which is referenced in identification of image data of each GUI stored in the GUI image storage 18 and conversion of information on a contact point to the contents of operation by the operation information converter 22.

In the displaying switching field 104, whether or not to display the respective GUIs shown in the GUI identification information field 102 is set. In FIG. 4, "ON," i.e. the setting to display the GUI, is set for all GUIs. By turning this setting to "OFF," i.e. the non-displayed state, the corresponding GUI is excluded from the display target. This can set unnecessary GUIs to the non-displayed state to reduce the hidden area of the content image. It is also possible that whether or not to display the object can be set on a button-by-button basis for GUIs composed of plural buttons, such as the directional key GUI, the four-type button GUI, and the SELECT/START button GUI.

In the position field 106, the position in the screen is set about each GUI shown in the GUI identification information field 102. Specifically, the position of the reference point, such as an upper left point or the center, of the material image of each GUI is set based on the X-coordinate (horizontal direction) and the Y-coordinate (vertical direction) of the screen. The Y-coordinate is represented as the ratio of the distance from a screen end to the vertical length of the screen. In FIG. 4, the ratio of the distance from the upper end is represented in percentage. On the other hand, the X-coordinate is represented as the length from a screen end. In FIG. 4, the distance from the left end of the screen is represented in inches for the left-side GUIs, and the distance from the right end of the screen is represented in inches for the right-side GUIs. As above, the origin and unit of the coordinate system of the screen for setting the position does not need to be common to all GUIs.

By employing this, regarding the vertical direction, GUIs can be placed at positions close to a hand with which the device is grasped, such as positions near the center, even when the screen size changes. On the other hand, regarding the horizontal direction, GUIs can be placed in a state of abutting on the left and right ends of the screen or near the ends within predetermined distance irrespective of change in the screen size. Furthermore, it is possible to prevent generation of unnatural concavity and convexity in the vertical GUI arrangement.

In the size field 108, the width "W" and the height "H" of the image of each GUI shown in the GUI identification information field 102 are set. In FIG. 4, these parameters are represented in inches. The GUI size suitable for operation depends mainly on the size and the range of motion of the finger and therefore is fixed irrespective of the screen size basically. However, as described later, the GUI placement section 26 carries out size adjustment depending on the screen size.

In the left-right link field 110, whether or not to display a pair of GUI placed on the left side of the screen and GUI placed on the right side at the same height level always irrespective of the screen size is set. The setting to display the pair of GUIs at the same height level, i.e. at the same position in the vertical direction, is referred to as "link." In FIG. 4, it is assumed that the "L button" and the "R button," the "left joystick" and the "right joystick," and the "cross button" and the "four-type button" make pairs and each pair is displayed at the same height level on the left and right sides basically.

Therefore, for the respective pairs, the Y-coordinates in the position field 106 are set to "5%," "20%," and "45%." However, as described later, the GUI placement section 26 decides placement different from this setting of the Y-coordinate in some cases depending on the GUI as the display target and the screen size. In this case, when the setting to link GUIs is made in the left-right link field 110, priority is given to it to thereby prevent unnatural placement due to the occurrence of difference in the height level in a pair of left and right GUIs. In FIG. 4, "ON," i.e. the setting to link GUIs, is set for all pairs. If it is unnecessary to link GUIs, "OFF" or the like is set.

Figure 5:
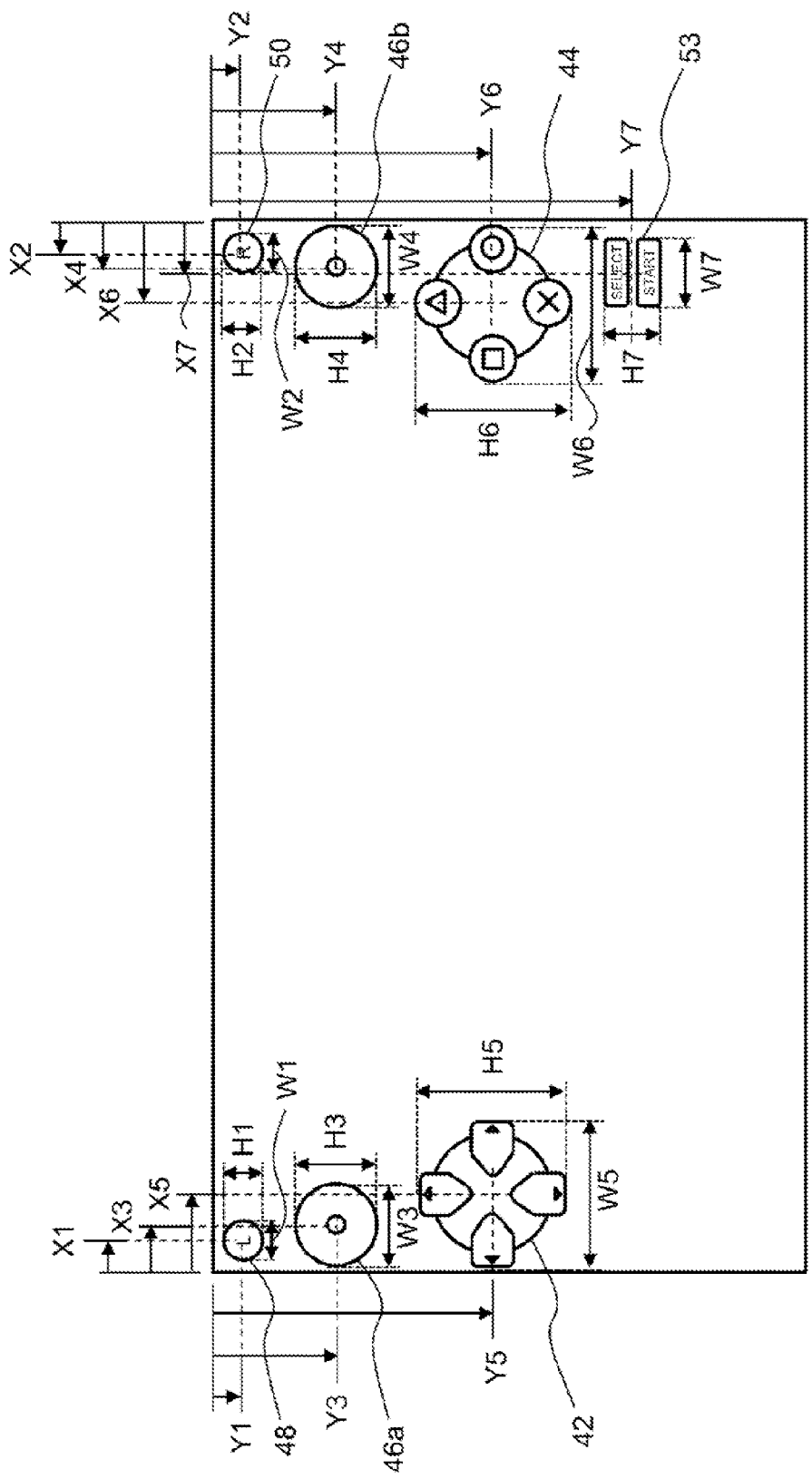
FIG. 5 is a diagram for explaining a setting example of the positions and sizes of the respective GUIs set in a GUI placement information table shown in FIG. 4.

FIG. 5 is a diagram for explaining a setting example of the positions and sizes of the respective GUIs set in the GUI placement information table 100 shown in FIG. 4. As shown in FIG. 5, an example is assumed in which, in a screen 120, the L button GUI 48, the left joystick GUI 46a, and the directional key GUI 42 are placed on the left side and the R button GUI 50, the right joystick GUI 46b, the four-type button GUI 44, and a SELECT/START button GUI 53 are placed on the right side. Here, the GUIs other than the SELECT/START button GUI 53 correspond to the respective GUIs shown in FIG. 1.

The SELECT/START button GUI 53 is in a state in which the figures of the SELECT button and the START button, which are arranged in the horizontal direction in the SELECT/START button GUI 52 shown in FIG. 1, are arranged in the vertical direction. This GUI is the GUI of the "SELECT/START button (vertical)" shown on the last row in the GUI placement information table 100 of FIG. 4 and is set separately from the "SELECT/START button (horizontal)" corresponding to the SELECT/START button GUI 52 in FIG. 1. Switching between the "SELECT/START button (vertical)" and the "SELECT/START button (horizontal)" will be described later.

For each of these seven kinds of GUIs, the position and size on the screen are set in the position field 106 and the size field 108. In the case of making the placement shown in FIG. 5, in order of the L button GUI 48, the left joystick GUI 46a, and the directional key GUI 42, (X1, Y1), (X3, Y3), and (X5, Y5) are set in the position field 106 and (W1, H1), (W3, H3), and (W5, H5) are set in the size field 108. X1, X3, and X5 are numerical values representing, in inches, the coordinates of the centroids of the respective GUIs on an axis that is so defined that the left end of the screen is 0 and the right direction is the positive direction. Y1, Y3, and Y5 indicate the coordinates of the centroids of the respective GUIs on an axis that is so defined that the upper end of the screen is 0 and the lower end is 100.

Similarly, in order of the R button GUI 50, the right joystick GUI 46b, the four-type button GUI 44, and the SELECT/START button GUI 53, (X2, Y2), (X4, Y4), (X6, Y6), and (X7, Y7) are set in the position field 106 and (W2, H2), (W4, H4), (W6, H6), and (W7, H7) are set in the size field 108. In this case, X2, X4, X6, and X7 are numerical values representing, in inches, the coordinates of the centroids of the respective GUIs on an axis that is so defined that the right end of the screen is 0 and the right direction is the positive direction. Y2, Y4, Y6, and Y7 are the same as the above description.

Figure 6:
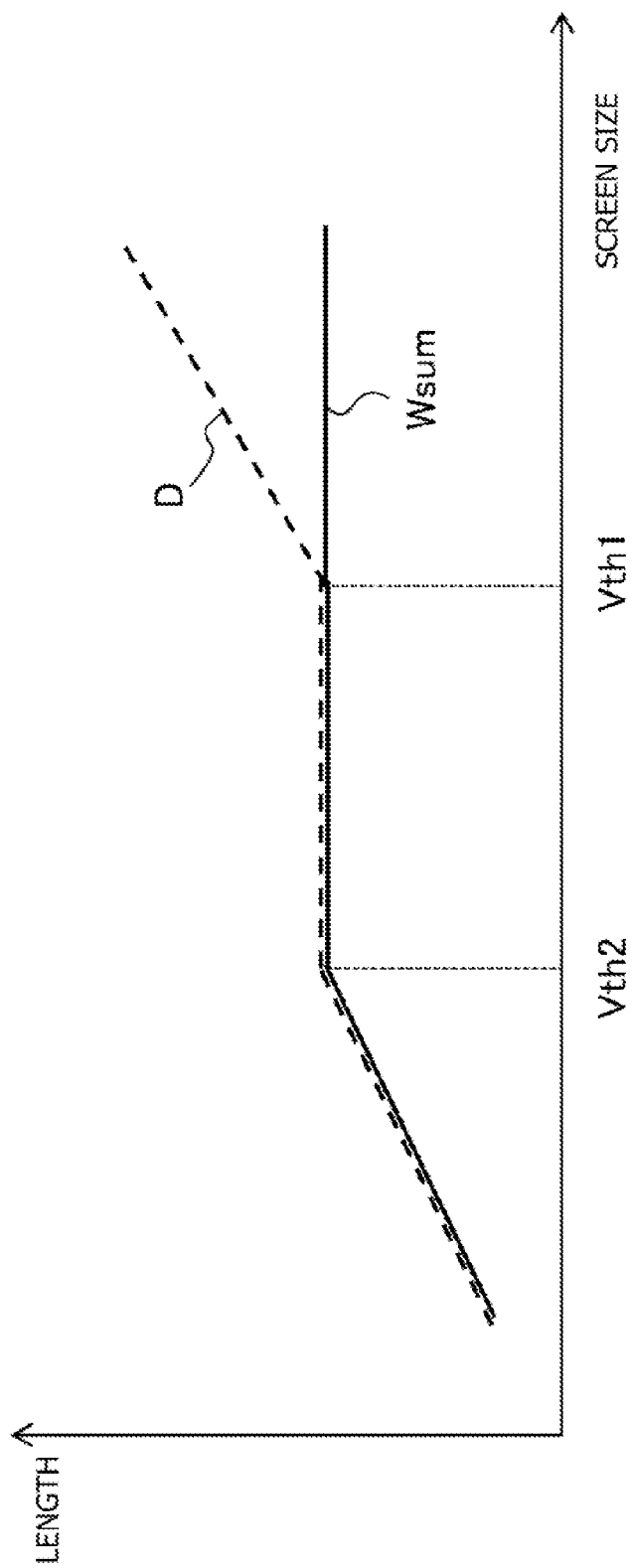
FIG. 6 is a diagram for explaining the principle of how a GUI placement section in the present embodiment decides the position and size of the GUI.

FIG. 6 is a diagram for explaining the principle of how the GUI placement section 26 decides the position and size of the GUI based on the screen size of its own device and the setting in the GUI placement information file 36. In FIG. 6, the dotted line shows the distance D between the centroids of two GUIs adjacent in the vertical direction, and the solid line shows change in the sum Wsum of the width occupied by the images of the two GUIs between these centroids relative to the screen size.

For example, when the left joystick GUI 46a and the directional key GUI 42 are taken as an example in the setting shown in FIG. 5, the following relationship is satisfied.

$$D=(Y5-Y3) \times V$$

$$W\text{sum}=(H3+H5)/2$$

Here, the height of the screen is defined as V (inches).

That is, when the setting is obeyed, the distance D between the centroids is a variable proportional to the height V of the screen and the sum Wsum of the width of the GUIs is a constant. Therefore, when the size of the screen becomes smaller, both become equal to each other eventually. In FIG. 6, the height of the screen at the time is defined as "Vth1." As shown in FIG. 6, in the case of a screen size whose height V is equal to or larger than Vth, the distance D between the centroids is longer than the sum Wsum of the width of the GUIs and therefore the GUIs do not overlap with each other. Therefore, under this condition, the GUI placement section 26 decides the positions and sizes of the respective GUIs in accordance with the setting of the GUI placement information file 36.

On the other hand, when the height V of the screen is smaller than Vth1, obeying the setting results in the state in which the distance D between the centroids is shorter than the sum Wsum of the width of the GUIs and the GUIs overlap with each other. In this case, the GUI placement section 26 invalidates the setting of the vertical position of these two GUIs in the setting of the GUI placement information file 36. Furthermore, as shown in FIG. 6, the GUI placement section 26 decides the positions of the two GUIs in such a manner as to provide the state in which the distance D between the centroids is equal to the sum Wsum of the width of the GUIs, i.e. the GUIs abut on each other. Vth is determined for each of pairs of two GUIs adjacent in the vertical direction. Thus, comparison with the height V of the screen is made to decide whether the setting value is valid or invalid for each of the pairs.

When the screen size becomes further smaller, the state in which all GUIs included in the vertical array abut on each other is obtained. In addition, when the setting is obeyed, the sum of the height of these GUIs surpasses the height V of the screen eventually. In FIG. 6, the height of the screen at the time is defined as "Vth2." In this case, the GUI placement section 26 also invalidates the setting of the size of these GUIs in the setting of the GUI placement information file 36 in addition to the setting of the vertical position thereof. Furthermore, as shown in FIG. 6, the GUI placement section 26 reduces the sizes of the GUIs by a factor of V/Vth2 in two directions, i.e. the vertical and horizontal directions. Also at this time, the GUI placement section 26 decides the positions in such a manner as to provide the state in which the GUIs abut on each other.

In this manner, the GUI placement section 26 calculates the values of Vth1 and Vth2 from the setting values of the GUI placement information file 36 and compares the magnitude of these values with the height V of the screen of its own device to thereby lead processing to any of the following three modes: displaying GUIs in accordance with the setting; invalidating the setting of the position of at least any GUI and displaying GUIs without a gap therebetween; and invalidating the setting of the position and size of all GUIs belonging to the vertical array and displaying reduced GUIs in a packed manner. By employing this, even when the screen size differs, GUIs can be so displayed that the setting intent in the GUI placement information file 36 is reflected as much as possible.

Figure 7:
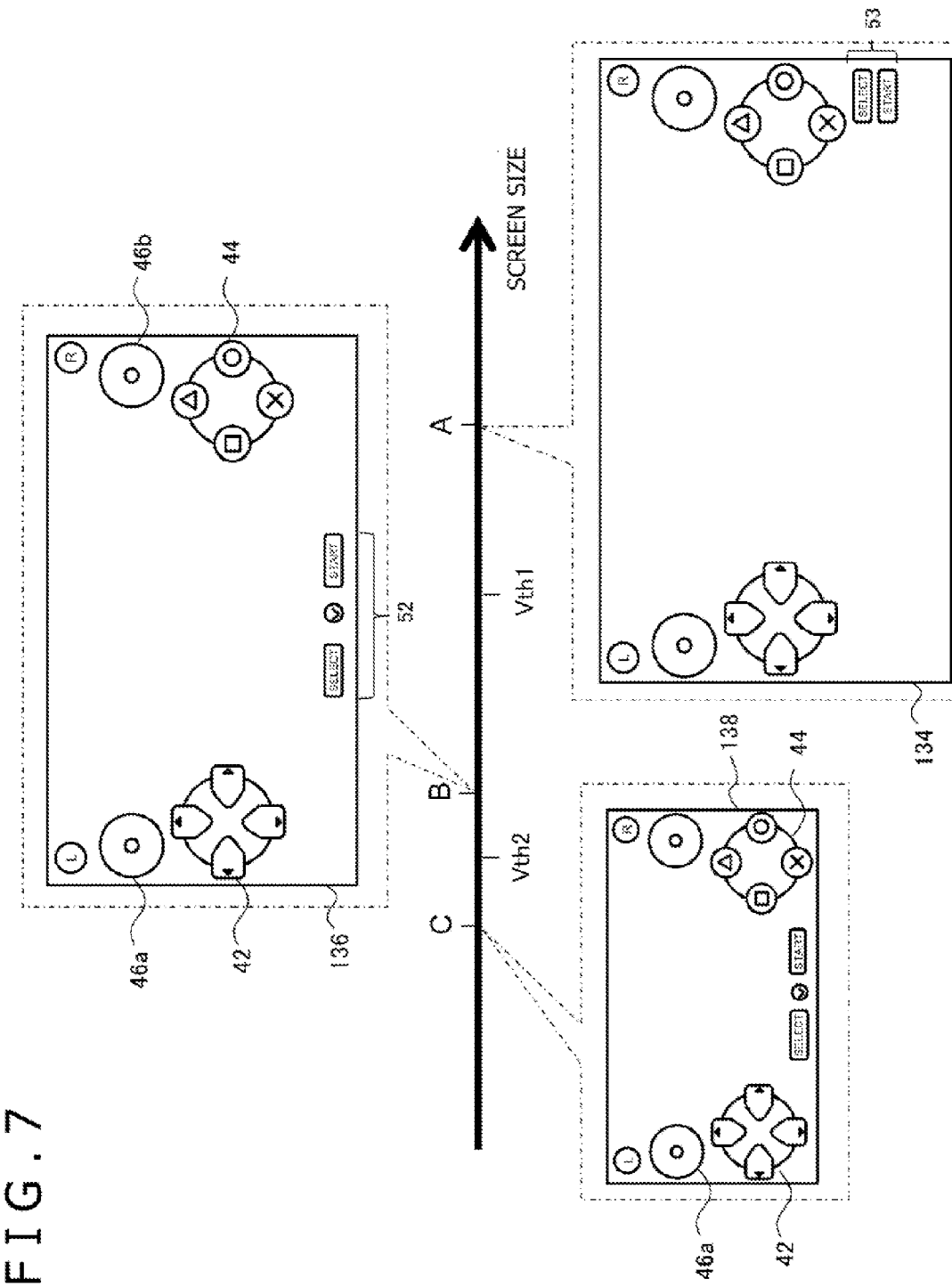
FIG. 7 is a diagram showing a change example of a GUI image in response to change in the screen size in the present embodiment.

FIG. 7 shows an example of change in a GUI image in response to change in the screen size. First, in a screen with a screen size A having a height V satisfying V>Vth1, the respective GUIs are displayed with positions and sizes in accordance with the setting of the GUI placement information file 36 (screen 134). On the other hand, in the case of a screen with a screen size C having a height V satisfying V<Vth2, the size of each GUI is reduced depending on the screen size and the GUIs are displayed in a packed manner in the vertical direction (screen 138).

In the case of a screen with a screen size B having a height V satisfying Vth2<V<Vth1, the size of each GUI is kept unchanged as described above and the GUIs are displayed with the vertical position adjusted (screen 136). In the example of FIG. 7, the directional key GUI 42 and the four-type button GUI 44 are located somewhat more downward compared with the case of the screen 134 so that they may be prevented from overlapping with the joysticks 46a and 46b, which are located immediately upward.

Furthermore, in the screen 136, the design and placement of the SELECT/START button GUI are switched. Specifically, switching is made from the SELECT/START button GUI 53, which is displayed on the screen right side in the screen 134 with the size A and is made by arranging figures of buttons in the vertical direction, to displaying of the SELECT/START button GUI 52 made by arranging the figures of buttons in the horizontal direction at the center of the screen lower end. Such switching may be so made that a predetermined screen size is employed as the switching boundary, or may be made when the SELECT/START button GUI overlaps with another GUI with the original setting.

The SELECT/START button GUI 53 in the screen 134 and the SELECT/START button GUI 52 in the screen 136 correspond to the "SELECT/START button (vertical)" and the "SELECT/START button (horizontal)" shown in the GUI placement information table 100 of FIG. 4. For the GUI whose shape and position are desired to be switched according to the screen size in terms of design or the GUI whose reduction is undesirable in a screen having a screen height V satisfying V<Vth2, plural patterns are set in the GUI placement information file 36 in advance in this manner.

Such switching is not limited to the SELECT/START button GUI. For example, the four-type buttons may be so displayed as to be horizontally arranged at the center of the screen lower end, or simply any GUI may be separated from the left or right GUI array and placed in another area. In either case, in view of the use frequency and operability of the GUI, the intent of the setting person, such as a thought that it is more preferable to change the position than to reduce the size, can be reflected. When the screen height V is smaller than Vth1, if another pattern of the target GUI is set in the GUI placement information file 36, the GUI placement section 26 employs it. If it is not set, the GUI placement section 26 decides the position and size depending on the relationship with other GUIs as described above.

In the state in which GUIs are displayed in a packed manner in the vertical direction like in the screen 138, for example if the left joystick 46a is in the non-displayed state, the directional key GUI 42 under it will be further shifted upward to be offset from the four-type button GUI 44, which is originally so designed as to be intended to be displayed at the same height level. To avoid such a situation, when the link is set in the GUI placement information table 100 of FIG. 4, the position is so decided as to give priority to it. Due to this, whatever the intervals from the upside and downside GUIs are, a pair of GUIs that should be displayed at the same height level is always displayed without offset.

Figure 8:
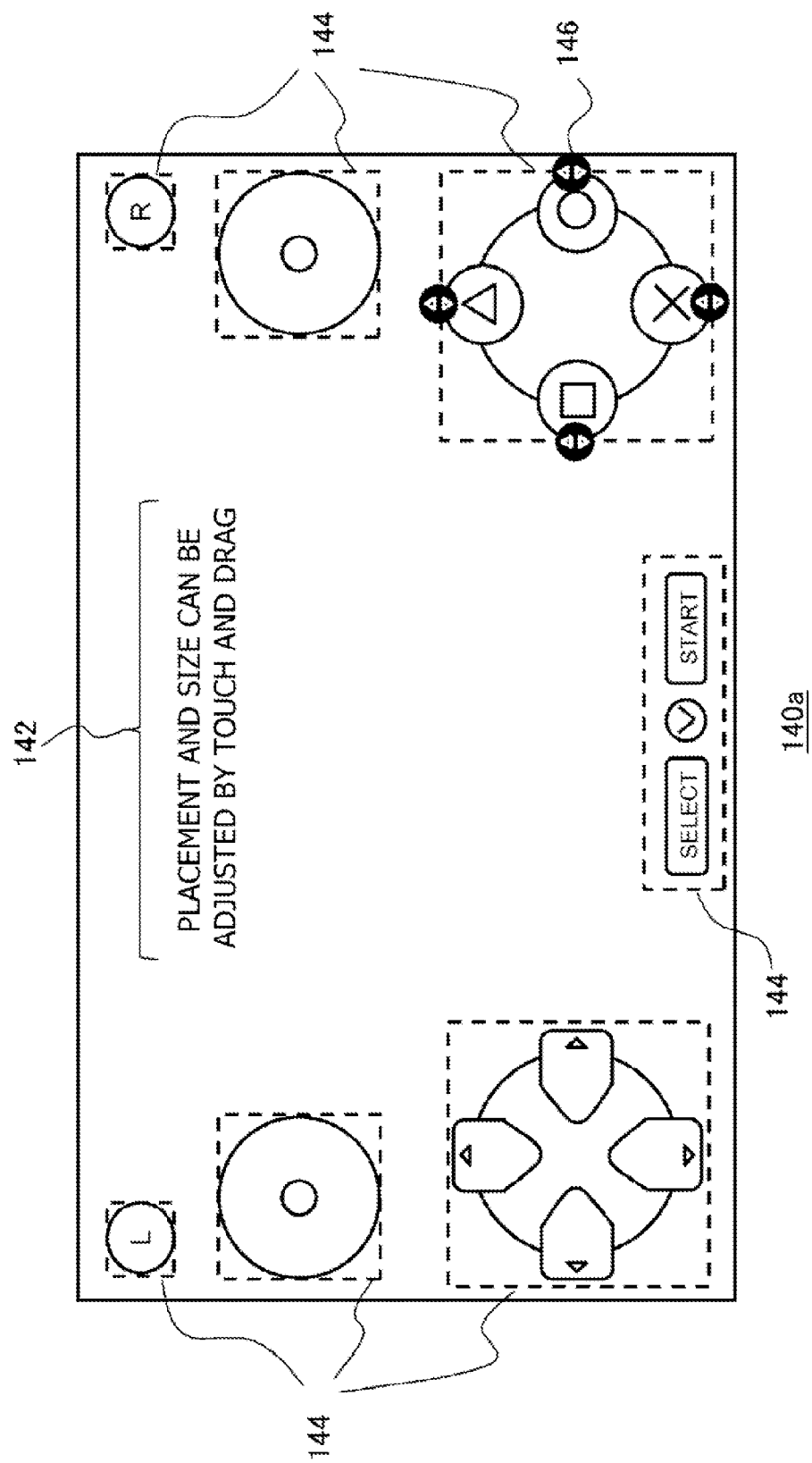
FIG. 8 is a diagram showing an example of an acceptance screen for allowing a user to adjust the position and size of the GUI in the present embodiment.

FIG. 8 shows an example of an acceptance screen that is displayed on the display 14 by the GUI placement adjustment acceptor 21 and allows the user to adjust the position and size of the GUI. This adjustment screen is so configured that it can be called any time by touching a predetermined button of a GUI whether the calling timing is before start of content execution processing or is in the middle of the processing. Alternatively, it may be called by calling a menu screen and making a choice from it.

A GUI placement adjustment screen 140a is obtained by displaying a message 142 prompting adjustment and rectangles 144 surrounding the respective GUIs on a GUI image immediately before adjustment start. In this example, by once touching a GUI desired to be adjusted among the GUIs surrounded by the rectangles 144, this GUI is set as the adjustment target. At this time, a FIG. 146 for accepting size adjustment of this GUI is displayed near the GUI. The user adjusts the size by moving it in the enlargement direction and the reduction direction. Furthermore, the user adjusts the position by touching the GUI as the adjustment target and moving it with the contact kept (dragging it).

Figure 9:
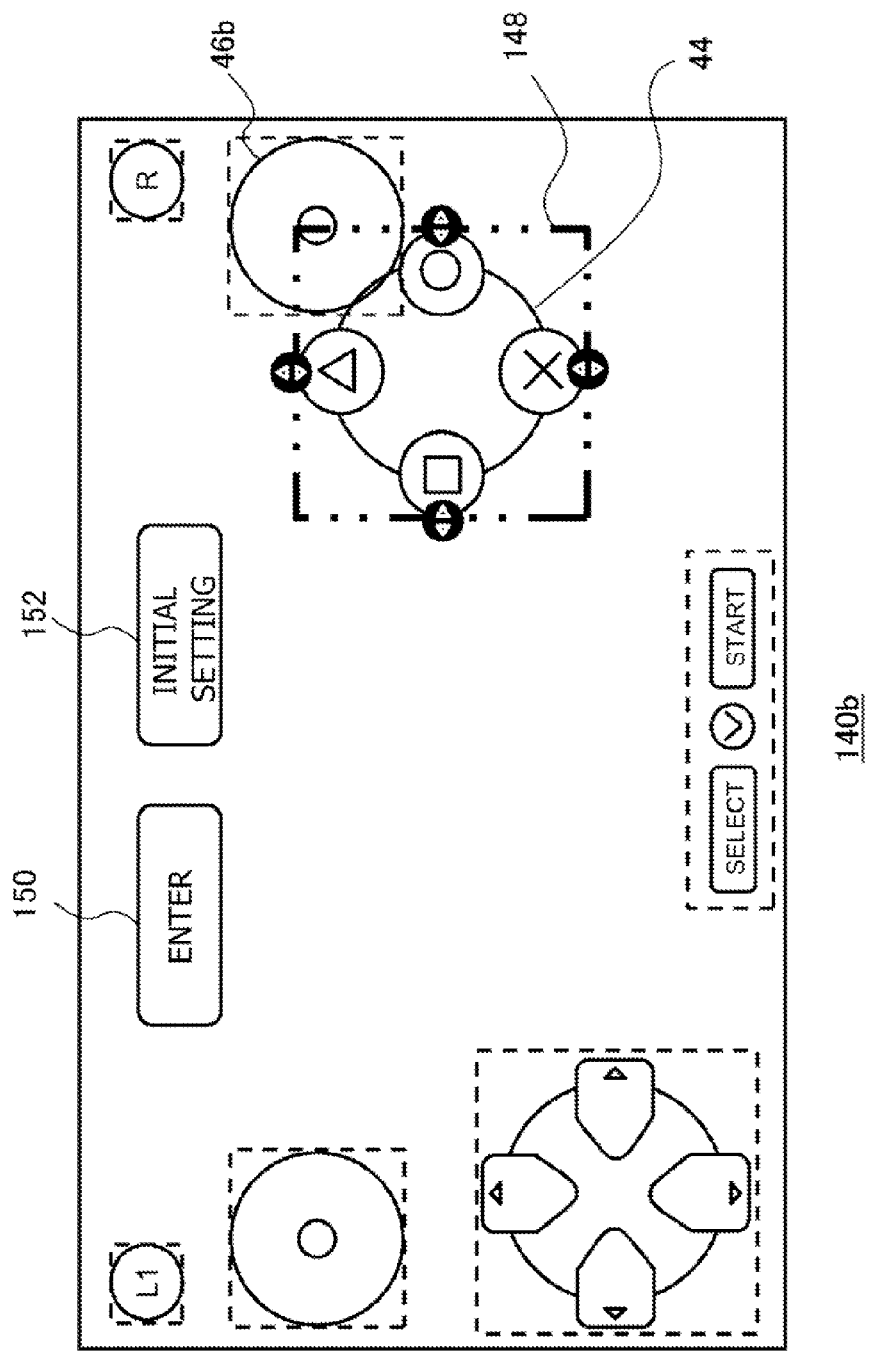
FIG. 9 is a diagram showing a screen example in which the GUI as the adjustment target is moving in the acceptance screen for adjusting the position and size of the GUI in the present embodiment.

FIG. 9 shows a screen example in which the GUI as the adjustment target is being moved in this manner. In a GUI placement adjustment screen 140b, the state is obtained in which the position of the four-type button GUI 44 has been moved leftward and upward by touching to the inside of the area of this GUI and dragging thereof by the user. However, when this GUI exists at a position overlapping with another GUI such as the joystick GUI 46b, the color and shape of a rectangle 148 surrounding the GUI are changed from those of the original rectangle 144 in order to indicate that the movement to this position is impossible.

If the position and size of the GUI as the adjustment target are changed on the adjustment screen in this manner, an enter button GUI 150 to settle this change and an initial setting button GUI 152 for return to the original setting are displayed instead of the message 142 in FIG. 8. If the enter button GUI 150 is touched, the GUI placement adjustment acceptor 21 creates or updates the user setting information file 37 representing the positions and placement of all GUIs at this timing by absolute values and stores it in the content storage 16. If the user setting information file is stored in the content storage 16, the GUI placement section 26 places the respective GUIs with priority to the information of the user setting information file 37 over the GUI placement information file 36. When the initial setting button GUI 152 is touched, the GUI placement adjustment acceptor 21 discards the user setting information file 37.

Figure 10:
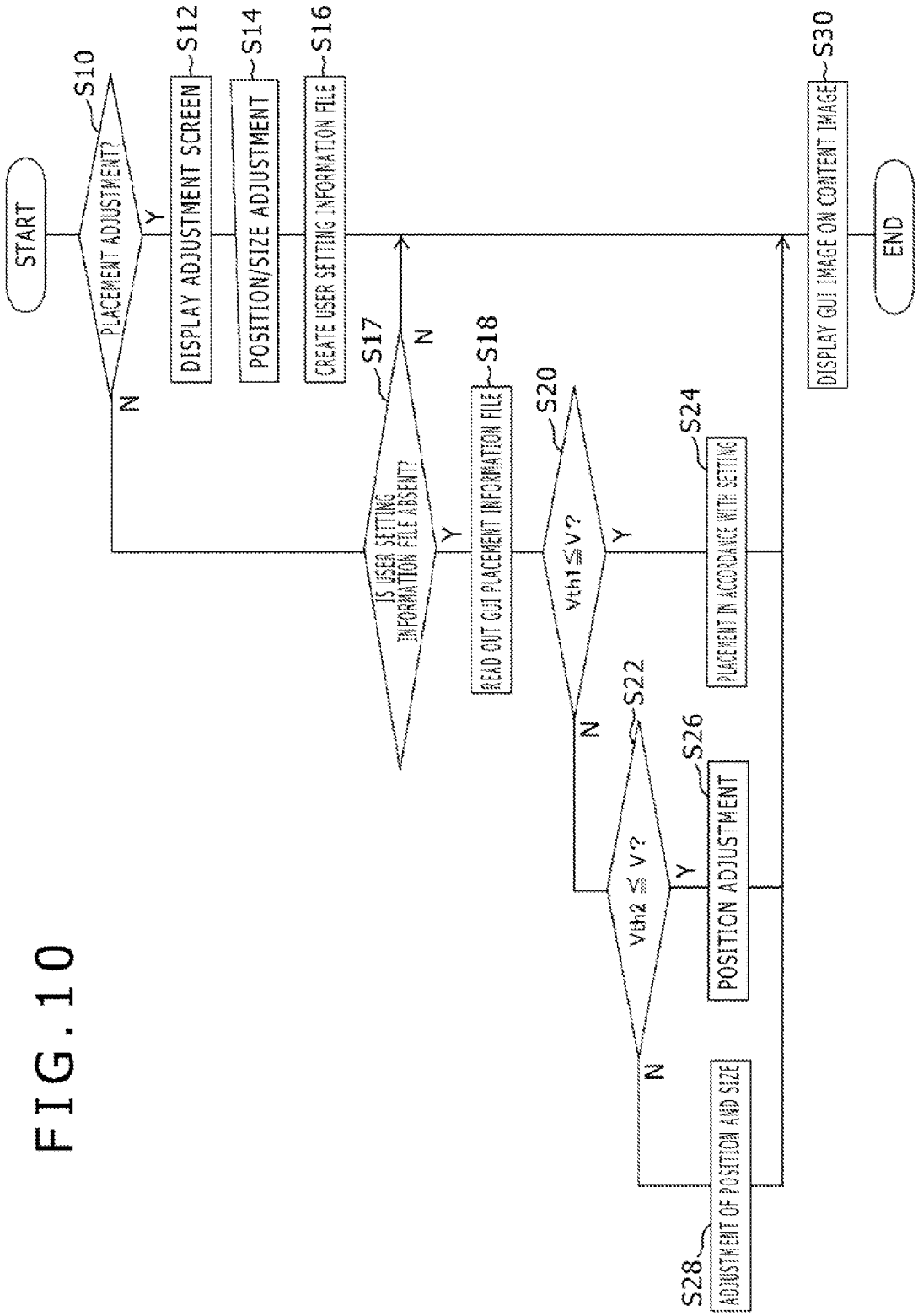
FIG. 10 is a flowchart showing the procedure of execution of processing relating to GUI image displaying by the information processing device in the present embodiment.

Next, the operation of the information processing device 10 that can be realized by the configuration explained thus far will be described. FIG. 10 is a flowchart showing the procedure of processing relating to GUI image displaying carried out by the information processing device 10. This flowchart is started when the information processing device 10 is activated by turning-on of the activation switch 40 by the user and when content that should be executed is selected. Suppose that, in parallel to the processing shown in FIG. 10, the content processor 24 and the content image generator 30 of the information processing device 10 execute information processing relating to content based on the content execution file 38 as appropriate.

First, if the user calls a GUI placement adjustment screen (Y of S10), the GUI placement adjustment acceptor 21 displays a GUI placement adjustment screen like that exemplified with FIG. 8 (S12). When the user drags a GUI desired to be adjusted and operates a figure for scaling to adjust the position and size of the GUI (S14), the GUI placement adjustment acceptor 21 creates the user setting information file 37 showing the GUI placement resulting from the adjustment by absolute values and stores it in the content storage 16 (S16). If the user setting information file 37 previously created exists, the GUI placement adjustment acceptor 21 updates it. Then, a GUI image is created based on the user setting information file 37 and displayed on a content image by on-screen displaying. Thereby, the final image is displayed (S30).

If the user does not carry out the GUI placement adjustment (N of S10), the GUI placement section 26 acquires the identification information of the selected content and so forth from the operation information converter 22 and refers to the content storage 16 to check whether the user setting information file 37 associated with this content is present or absent (S17). If the relevant file is present (N of S17), a GUI image is created based on it and displayed on a content image by on-screen displaying. Thereby, the final image is displayed (S30).

If the user setting information file 37 is absent (Y of S17), the GUI placement section 26 reads out the GUI placement information file 36 associated with the content from the content storage 16 (S18). Then, about GUIs set as the display target in this file, the GUI placement section 26 compares the screen height Vth1, across which overlapping of adjacent GUIs occurs, with the screen height V of its own device (S20). As described above, Vth1 is calculated for each of pairs of adjacent GUIs.

If Vth1≤V is satisfied for all pairs of GUIs (Y of S20), the GUI placement section 26 generates a GUI image by placing the GUI image stored in the GUI image storage 18 with the positions and sizes of the GUIs set in the GUI placement information file 36 (S24). On the other hand, if a pair of GUIs with the relationship of V<Vth1 exists (N of S20), the GUI placement section 26 further compares the height Vth2, across which the vertical array of the GUIs comes not to fit inside the screen when only the positions are adjusted, with the screen height V of its own device (S22).

If Vth2≤V is satisfied (Y of S22), the vertical position of at least either one GUI in the pair of GUIs with the relationship of V<Vth1 is adjusted from the setting value so that these GUIs may be displayed at positions that do not overlap with but abut on each other (S26). For example, without adjusting the position of the upper GUI, the position of the lower GUI is so adjusted that it abuts on the upper GUI. If the setting to change the placement and design is made in the GUI placement information file 36 like for the above-described SELECT/START button GUI, priority is given to this setting.

If V<Vth2 is satisfied (N of S22), all GUIs included in the array are reduced by a factor of V/Vth2 and the positions are adjusted so that they may be displayed at such positions as to abut on each other (S28). However, for a pair of left and eight GUIs for which the link is set in the GUI placement information file 36, priority is given to the link. Then, the GUI image created in S24, S26, or S28 is displayed on a content image by on-screen displaying and thereby the final image is displayed (S30).

As described above, the GUI placement section 26 may change the GUI image as needed by executing the processing of S18 to S30 in accordance with the contents of operation to the GUI being currently displayed. Furthermore, when the user has called the GUI placement adjustment screen, the GUI placement adjustment acceptor 21 may update the user setting information file 37 as needed by executing the processing of S12 to S16.

So far, description is made about a mode in which, in a device to execute content, a suitable GUI image is created according to the size of the screen possessed by this device. Next, a device for assisting creation of the GUI placement information file offered with the content execution file will be described. For example, this device is utilized for creation of the GUI placement information file with the optimum setting in view of images displayed in content and the necessary input means, in conjunction with creation of the content, by a content creator or production company.

In the present embodiment, as described above, one GUI placement information file is created in advance and thereby an information processing device itself autonomously adjusts the size and placement of the GUI in such a manner as to follow the setting intent of the file as much as possible whatever the screen size of the information processing device is. However, in such a case, at the stage of content creation, actual devices having a variety of screen sizes are necessary to check how the setting of the GUI placement information file is reflected in the actual GUI image.

To prevent a situation in which, in a device with a size about which a content creator does not have an actual device, unexpected GUI sizes and placement are made and thus difficulty in operation and the lowering of the visibility of the content image are caused, the present embodiment intends to allow a GUI image to be simulated by a virtual screen. FIG. 11 shows the configuration of a GUI placement simulator that assists creation of the GUI placement information file.

A GUI placement simulator 160 includes a placement setting acceptor 162 that accepts setting values to the GUI placement information file, a screen size designation acceptor 164 that accepts size designation of a virtual screen, and a GUI image display section 166 that displays a GUI image on the virtual screen. The GUI placement simulator 160 further includes a GUI placement information file storage 168 that stores the GUI placement information file and a GUI image storage 170 that stores data of material images prepared as GUIs. As shown in FIG. 11, the GUI placement simulator 160 is so configured as to receive a signal from general input means such as keyboard and mouse and output the image data that should be displayed to a display.

The placement setting acceptor 162 displays a GUI placement information table representing a list of items that can be set in the GUI placement information file 36, like that shown in FIG. 4, on the display. The respective items are so configured that manual operation input of data by the input means is possible. While viewing the displayed GUI placement information table, the setting person carries out switching between the displayed state and the non-displayed state about each GUI, setting of the position and size of each GUI, and link setting.

The screen size designation acceptor 164 displays a screen to accept designation of the size of the virtual screen on the display. While viewing the displayed acceptance screen, the setting person designates the size and aspect ratio of the virtual screen. The GUI image display section 166 decides the size and position of the GUI by the same scheme as the GUI placement section 26 of the information processing device 10 based on the setting relating to the GUI placement to the placement setting acceptor 162 and the size of the virtual screen designated with the screen size designation acceptor 164. Then, the GUI image display section 166 reads out the image data of the respective GUIs from the GUI image storage 170. In addition, the GUI image display section 166 generates a GUI image corresponding to the virtual screen size and displays it on the display.

The setting person checks the GUI image displayed by the GUI image display section 166 with various changes in the screen size with the screen size designation acceptor 164 and modifies the setting in the placement setting acceptor 162 so that a favorable GUI image can be obtained with any screen size. When the final setting values can be settled, the placement setting acceptor 162 stores the GUI placement information file configured with these setting values in the GUI placement information file storage 168. A standard GUI placement information file may be stored in the GUI placement information file storage 168 in advance and a new GUI placement information file may be stored through modification by the setting person.

Figure 12:
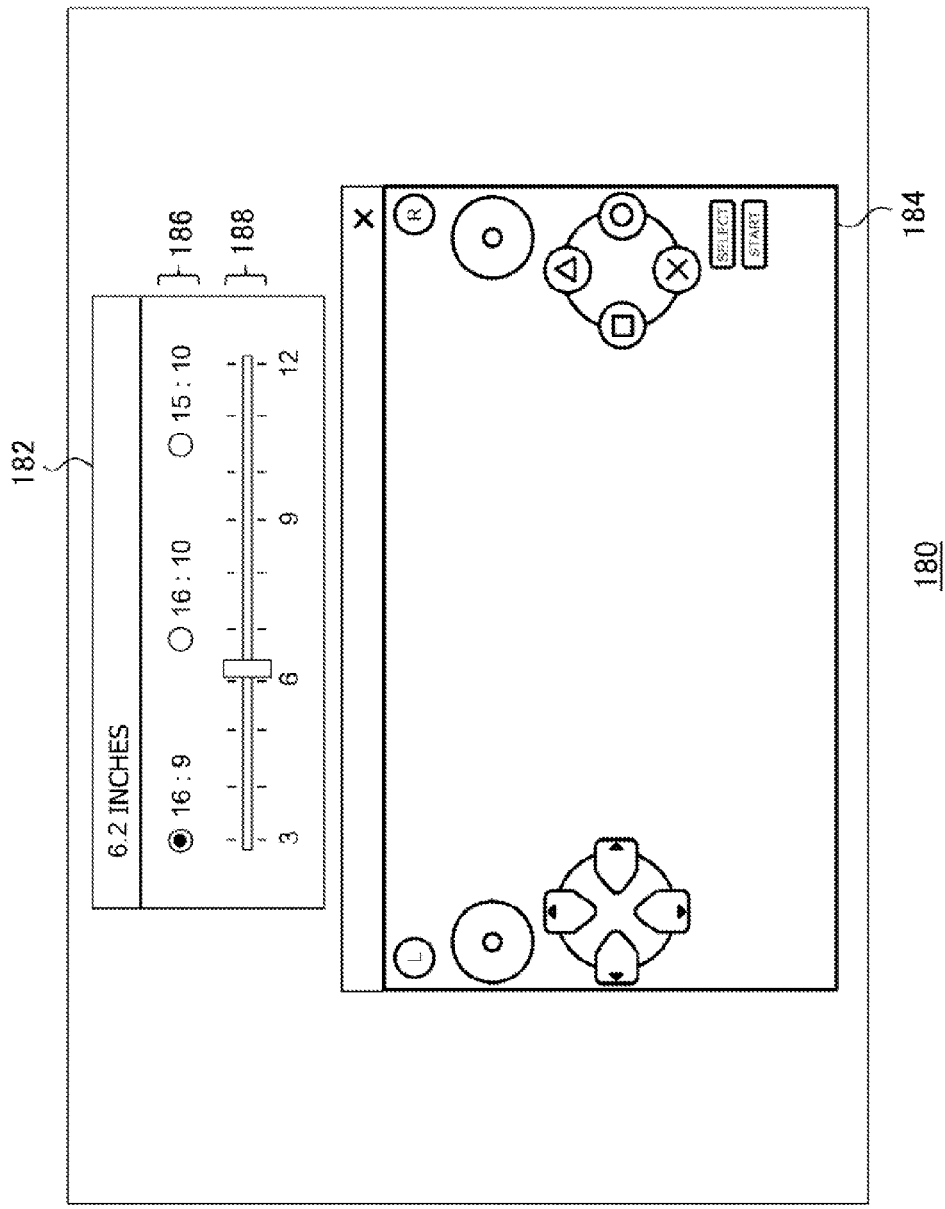
FIG. 12 is a diagram showing a screen example displayed by a GUI placement simulator in the present embodiment.

FIG. 12 shows a screen example displayed by the GUI placement simulator 160. A GUI placement simulation screen 180 includes a screen size designation window 182 for accepting designation of the virtual screen size and a GUI image display window 184 that displays a GUI image corresponding to the designated virtual screen size. A setting screen of the GUI placement information file is not displayed in this screen based on the assumption that setting to the GUI placement information file is separately made. However, the setting screen may be simultaneously displayed in the same screen.

The screen size designation window 182 is displayed by the screen size designation acceptor 164 and is composed of an aspect ratio selection box 186 and a screen size change bar 188. The setting person can arbitrarily select the size of the virtual screen by selecting one aspect ratio from the aspect ratio selection box 186 and horizontally moving the bar in the screen size change bar 188. The aspect ratio and size selected in this manner are reflected in the aspect ratio and size of the GUI image display window 184.

By these kinds of operation, emulation of a device having a standard aspect ratio can be carried out comparatively easily. The GUI image display window 184 may be changed by a method for changing the window size in a general window system, specifically e.g. by dragging the window boundary with a mouse or the like. This allows easy emulation also for a screen configuration having a free aspect ratio and facilitates detection of e.g. failure occurring with a specific screen ratio or screen size.

The GUI image display section 166 displays the respective GUIs with the placement in accordance with the setting of the GUI placement information file being currently created in the GUI image display window 184 having such a size. The processing at this time is the same as the processing executed by the GUI placement section 26 of the information processing device 10. However, every time operation of designating the screen size to the screen size designation window 182 is carried out, the GUI image display section 166 updates the GUI image displayed in the GUI image display window 184 in linkage with the operation.

Figure 13:
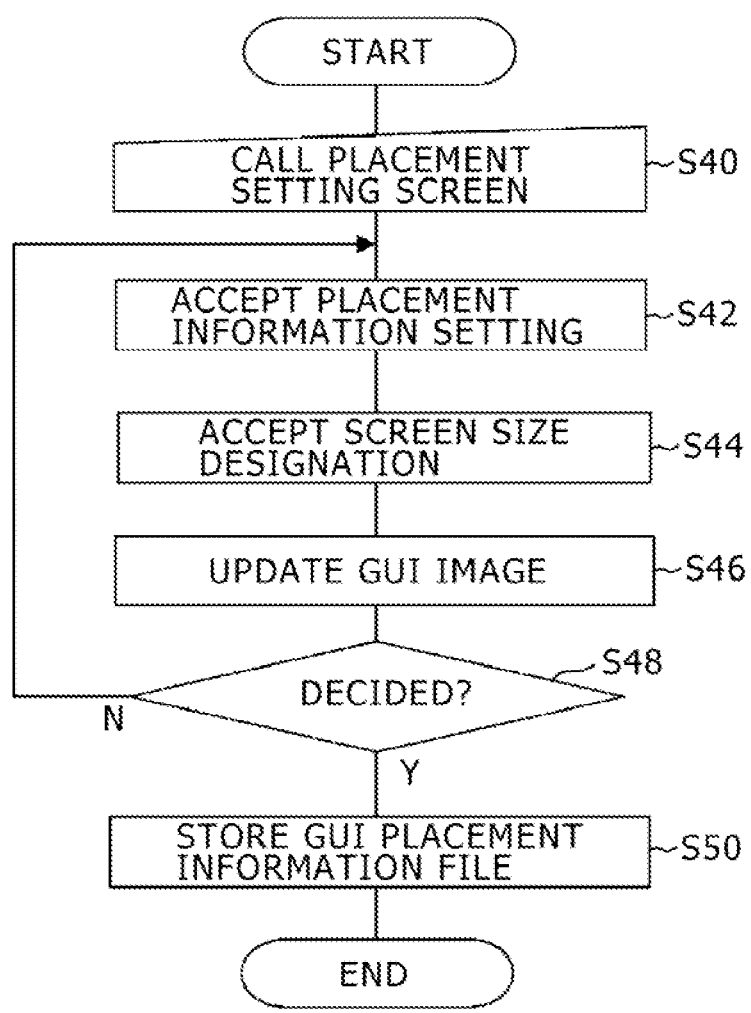
FIG. 13 is a flowchart showing the procedure of processing of assisting creation of the GUI placement information file by the GUI placement simulator in the present embodiment.

Next, the operation of the GUI placement simulator having the above-described configuration will be described. FIG. 13 is a flowchart showing the procedure of processing of assisting creation of the GUI placement information file by the GUI placement simulator 160. This processing is started when a setting person activates the GUI placement simulator 160 for example. First, when the setting person calls a placement setting screen (S40), the placement setting acceptor 162 accepts setting of placement information by displaying a GUI placement information table in the state in which the respective items can be input (S42).

Next, the screen size designation acceptor 164 displays the screen size designation window 182 and the GUI image display section 166 displays the GUI image display window 184. Furthermore, the GUI image display section 166 updates the GUI image in the GUI image display window 184 every time designation of the screen size to the screen size designation window 182 is accepted (S44, S46). The processing of S46 is equivalent to the processing of S20 to S28 in FIG. 10. Until an input to finally decide the setting of the GUI placement information file, such as closing the GUI image display window 184, is made (N of S48), the processing of S42, S44, and S46 is repeated. Alternatively, only the processing of S44 and S46 is repeated.

If the final decision of the GUI placement information file is made (Y of S48), this GUI placement information file is stored in the GUI placement information file storage 168 (S50). This file is associated with the content execution file separately crated and is recorded in a recording medium or the like or is made downloadable from a content provision server or the like. Thereby, the file is allowed to be collectively stored in the content storage 16 of the information processing device 10.

In the description made thus far, GUI placement suitable for content is realized by the GUI placement information file common even to screens with different sizes. On the other hand, in an information processing device that is greatly different in the grasped position, the image display position, and so forth, priority order about the respective GUIs and the positions and sizes of them differs in some cases. So, the range of the applicable information processing device may be further widened by providing plural GUI placement information files associated with one content execution file.

FIG. 14 is a diagram for explaining such a mode. In the example of this diagram, in addition to a GUI placement information file 194 for one screen in which a setting for the one-screen information processing device 10 described thus far is recorded, a GUI placement information file 196 for two screens in which a setting for a two-screen information processing device 192 of a foldable type or a slidable type is recorded is associated with one content execution file 198.

For example, when content for one screen is executed by the information processing device 192 having upper and lower two screens, possibly only the upper screen of the mounted two screens will be used for displaying the content image. In this case, easiness in viewing the content image is not affected even when GUIs with large sizes are displayed on the lower screen. Furthermore, generally it is expected that the chassis of the lower screen side is grasped. Therefore, it is desirable that the GUI for which high-frequency operation or quick operation is necessary is displayed on the lower screen.

In view of such a characteristic difference, by generating plural GUI placement information files and collecting them into a bundle of content files together with the content execution file, GUI displaying in a form suitable for content can be realized in a variety of information processing devices easily at low cost. In the GUI placement information file 194 for one screen and the GUI placement information file 19 for two screens, information to identify whether the file is for one screen or for two screens is embedded as header information. The GUI placement section 26 of a device that executes content reads out either one of the files based on the number of screens of its own device and places GUIs.

In the case of two screens, the GUI placement section 26 of the information processing device 10 and the GUI placement simulator 160 execute the above-described processing and simulation to adjust the position and size of the GUI for each of the screens. Furthermore, in the GUI placement information file for two screens, in association with each GUI, a field in which whether the relevant GUI is to be displayed on the first screen or the second screen is set is further made.

According to the above-described present embodiment, in the GUI placement information file generated in association with the content execution file, the displayed or non-displayed state, the display position, the display size, and the link of a pair of left and right GUIs are set about each GUI. Then, an information processing device that executes content displays GUIs as the display target after referring to the GUI placement information file and carrying out adjustment according to the screen size of its own device.

This can display the GUIs with positions and sizes suitable for the content whatever size the screen of the information processing device has. Only basic information relating to GUI placement is associated with a content execution file as a GUI placement information file and the information processing device autonomously carries out adjustment by using material images of GUIs retained by itself. This can realize a GUI display mode suitable for both content and the screen size easily at low cost. By making the GUI placement information file independent of the content execution file, adjustment of GUI placement by the user based on the user's preference is also easily allowed.

Furthermore, at the stage of creation of the GUI placement information file, a GUI placement simulator virtually creates screens with various sizes and displays how the position and size of the GUI change. This allows the setting person to check in detail what GUIs are displayed actually by the GUI placement information file being currently created without possessing information processing devices having a variety of screen sizes. This can preliminarily prevent the occurrence of troubles such as unexpected GUI placement depending on the screen size.

Moreover, for devices greatly different in the display form and hence the priority order of the position and size of the GUI, such as a one-screen information processing device and a two-screen information processing device, GUI placement information files are individually created to be associated with a content execution file. In content execution, by reference to the GUI placement information file corresponding to the screen form of its own device, a GUI image suitable for the screen form can be displayed. By preparing plural GUI placement information files in this manner, the present embodiment can be easily applied to not only information processing devices different in the number of screens but also all information processing devices having a horizontally-elongated screen, a vertically-elongated screen, a screen with a significantly-different size, etc.

The present invention is described above based on the embodiment. It will be understood by those skilled in the art that the above-described embodiment is exemplification and various modification examples are possible in the combinations of the respective constituent elements and the respective processing processes of the embodiment and such modification examples are also within the scope of the present invention.

REFERENCE SIGNS LIST

10 Information processing device, 12 Touch panel, 14 Display, 16 Content storage, 18 GUI image storage, 20 Input/output controller, 21 GUI placement adjustment acceptor, 22 Operation information converter, 24 Content processor, 26 GUI placement section, 28 GUI image buffer, 30 Content image generator, 32 Content image buffer, 34 Image combiner, 36 GUI placement information file, 38 Content execution file, 160 GUI placement simulator, 162 Placement setting acceptor, 164 Screen size designation acceptor, 166 GUI image display section, 168 GUI placement information file storage, 170 GUI image storage.

INDUSTRIAL APPLICABILITY

As described above, the present invention is applicable to information processing devices such as computer, game machine, content display terminal, and content generating device.

The invention claimed is:
1. An information processing device that includes a display covered by a touch panel and executes information processing selected by a user, the information processing device being characterized by including
a GUI image generator that generates a plurality of Graphical User Interface (GUI) images to be displayed on the display,
wherein the display has a height V and a width W; and
an operation information converter that identifies contents of operation carried out by the user from a correspondence relationship between a contact point detected by the touch panel and each GUI image currently being displayed,
wherein the GUI image generator finally decides a position and a size for each GUI image and generates each GUI image by carrying out an adjustment corresponding to a result of a comparison between the height V and the width W of the display with a condition with respect to a display size,
wherein position information and size information for each GUI are recorded in a GUI placement information file created as a standard setting irrespective of the display size,
wherein, in the GUI placement information file;
an x-coordinate position of each GUI image is set as a fixed x-value,
a y-coordinate of each GUI image is set as a ratio of a distance from a display end to the height V of the display,
a GUI width of each GUI image is set as a fixed width, and
a GUI height of each GUI image is set as a fixed height;
wherein the GUI image generator compares the height V of the display to a first predetermined value Vth1 and a second predetermined value Vth2, with Vth1>Vth2,
wherein, when the height V of the display is larger than Vth1, the GUI image generator displays each GUI image using the x-coordinate position, the y-coordinate position, the GUI width, and the GUI height of each GUI image stored in the GUI placement information file,
wherein, when the height V of the display is Vth1>V>Vth2, the GUI image generator:
determines if any GUI images overlap using the GUI placement information file, invalidates the x-coordinate position and the y-coordinate position of the GUI images that overlap, and displays the GUI images that overlap as abutting each other, and wherein, when the height V of the display is less than Vth2, the GUI image generator:

invalidates the x-coordinate position, the y-coordinate position, the GUI width, and the GUI height of each GUI image stored in the GUI placement information file, reduces the GUI height and the GUI width of each GUI image by a factor of V/Vth2, and displays the reduced GUI images as abutting each other on the display.

2. The information processing device according to claim 1, characterized in that the GUI placement information file is generated for each file for executing information processing and is stored in a storage device, and the GUI image generator generates the GUI image by reading out, from the storage device, the GUI placement information file created for the file for executing information processing selected by the user.

3. The information processing device according to claim 1, characterized in that the GUI placement information file is created corresponding to each of a one-screen display and a two-screen display and is stored in a storage device together with a file for executing information processing, and the GUI image generator generates the GUI image by selecting the GUI placement information file corresponding to the own device and reading out the GUI placement information file from the storage device.

4. The information processing device according to claim 1, characterized in that in the GUI placement information file, a plurality of setting patterns are recorded for a GUI image having the same function, and the GUI image generator changes the x-coordinate, the y-coordinate, the GUI height, and the GUI width by switching the setting pattern as the adjustment corresponding to the result of the comparison.

5. The information processing device according to claim 1, characterized by further including a GUI placement adjustment acceptor that displays, on the display, a GUI placement adjustment screen to accept adjustment of setting values from the user of the x-coordinate, the y-coordinate, the GUI height, and the GUI width of each GUI image.

6. The information processing device according to claim 1, characterized in that the GUI with which an image is generated by the GUI image generator includes a GUI of a pseudo-joystick that accepts input of direction and amount defined by a direction vector from a predetermined reference point to a contact point, and the operation information converter deems operation to the joystick GUI as valid and employs a whole area of the touch panel as a detection area during a period when contact with the touch panel by the user continues from timing of start of contact, by the user, with a detection area in which start of operation to the joystick GUI is detected.

7. The information processing device according to claim 6, characterized in that the operation information converter disables the other GUIs included in the GUI image during a period when the operation information converter deems operation to the joystick GUI as valid.

* * * * *